(12) United States Patent
Lewis et al.

(10) Patent No.: US 12,150,586 B2
(45) Date of Patent: Nov. 26, 2024

(54) NONSTICK COOKWARE MATERIALS, AND METHODS FOR MANUFACTURE AND USE

(71) Applicant: ADVANCED FLEXIBLE COMPOSITES, INC., Lake In The Hills, IL (US)

(72) Inventors: William Christopher Lewis, St. Charles, IL (US); Barton R. Lewis, Jr., Algonquin, IL (US); Paul A. E. Smith, Cary, IL (US); Kevin Patrick Dunlea, Cary, IL (US); Michael Baker, Petersburgh, NY (US); William James Lewis, Naples, FL (US); Barton Roy Lewis, Algonquin, IL (US); Jian Gao, St. Charles, IL (US); Lambert Allen Terpstra, Crystal Lake, IL (US)

(73) Assignee: ADVANCED FLEXIBLE COMPOSITES, INC., Lake In The Hills, IL (US)

( * ) Notice: Subject to any disclaimer, the term of this patent is extended or adjusted under 35 U.S.C. 154(b) by 664 days.

(21) Appl. No.: 17/269,465

(22) PCT Filed: Aug. 20, 2019

(86) PCT No.: PCT/US2019/047249
§ 371 (c)(1),
(2) Date: Feb. 18, 2021

(87) PCT Pub. No.: WO2020/041299
PCT Pub. Date: Feb. 27, 2020

(65) Prior Publication Data
US 2021/0196077 A1    Jul. 1, 2021

Related U.S. Application Data

(60) Provisional application No. 62/719,799, filed on Aug. 20, 2018, provisional application No. 62/829,706, (Continued)

(51) Int. Cl.
*A47J 43/20* (2006.01)
*A47J 36/02* (2006.01)
(Continued)

(52) U.S. Cl.
CPC ............ *A47J 36/04* (2013.01); *A47J 36/025* (2013.01); *A47J 36/16* (2013.01); *A47J 37/108* (2013.01);
(Continued)

(58) Field of Classification Search
CPC .......... A47J 36/04; A47J 36/025; A47J 36/16; A47J 37/108; B32B 3/08; B32B 5/024;
(Continued)

(56) References Cited

U.S. PATENT DOCUMENTS 4,503,168 A * 3/1985 Hartsing, Jr. ........... C08L 81/06
524/427
4,541,411 A    9/1985 Woolf
(Continued)

FOREIGN PATENT DOCUMENTS

EP    3066927 A1    9/2016
JP    2012116540    6/2012
(Continued)

OTHER PUBLICATIONS

ISA/US, English language verison of the Supplementary European Search Report, Form 1503 03.82, for European Application EP 19 851 025.7 (16 pages).
(Continued)

*Primary Examiner* — Elizabeth J Volz
(74) *Attorney, Agent, or Firm* — Pauley Erickson & Swanson

(57) ABSTRACT

Heat resistant and/or nonstick polymer materials and composites, and cookware including a food support surface comprising an integrated or attached cooking surface formed of the materials and composites. The cookware can includes a melt-processible fluoropolymer surface or insert. The cookware can further include a laminate material with
(Continued)

structural rigidity, wherein the laminate material includes a flexible substrate impregnated with the heat resistant polymer material, coated with a nonstick coating, and pressed or molded in a shaped cookware or other nonstick items or component. Various cooking devices can be pressed from the material, as well as oven or vehicle components.

25 Claims, 17 Drawing Sheets

Related U.S. Application Data filed on Apr. 5, 2019, provisional application No. 62/834,189, filed on Apr. 15, 2019.

(51) Int. Cl.
| | |
|---|---|
| *A47J 36/04* | (2006.01) |
| *A47J 36/16* | (2006.01) |
| *A47J 37/10* | (2006.01) |
| *B32B 3/08* | (2006.01) |
| *B32B 5/02* | (2006.01) |
| *B32B 27/08* | (2006.01) |
| *B32B 27/12* | (2006.01) |
| *B32B 27/32* | (2006.01) |
| *B32B 37/10* | (2006.01) |

(52) U.S. Cl.
CPC ............... *B32B 3/08* (2013.01); *B32B 5/024* (2013.01); *B32B 27/08* (2013.01); *B32B 27/12* (2013.01); *B32B 27/322* (2013.01); *B32B 37/10* (2013.01); *B32B 2255/10* (2013.01); *B32B 2255/26* (2013.01); *B32B 2262/101* (2013.01)

(58) Field of Classification Search
CPC ....... B32B 27/08; B32B 27/12; B32B 27/322; B32B 37/10; B32B 2255/10; B32B 2255/26; B32B 2262/101
USPC .................................................... 220/573.2
See application file for complete search history.

(56) References Cited

U.S. PATENT DOCUMENTS

| | | | |
|---|---|---|---|
| 4,610,918 A | 9/1986 | Effenberger et al. | |
| 5,240,775 A | 8/1993 | Tannenbaum | |
| 5,603,996 A * | 2/1997 | Overcash | D21H 27/001 |
| | | | 428/420 |
| 6,761,964 B2 | 7/2004 | Tannenbaum | |
| 6,770,287 B1 * | 8/2004 | Sun | A01N 25/10 |
| | | | 424/404 |
| 7,150,221 B2 * | 12/2006 | Morgan | A21B 3/13 |
| | | | 99/428 |
| 8,642,171 B2 | 2/2014 | Liu | |
| 8,714,398 B2 | 5/2014 | Lewis et al. | |
| 8,857,652 B2 | 10/2014 | Lewis et al. | |
| 2005/0005779 A1 * | 1/2005 | Morgan | A21B 3/13 |
| | | | 99/426 |
| 2006/0134404 A1 | 6/2006 | Witsch | |
| 2008/0178747 A1 | 7/2008 | Baker et al. | |
| 2009/0110935 A1 | 4/2009 | Lewis et al. | |
| 2011/0146501 A1 | 6/2011 | Woerner et al. | |
| 2011/0311701 A1 | 12/2011 | Lewis et al. | |
| 2013/0277374 A1 * | 10/2013 | Lewis | A47J 36/16 |
| | | | 220/573.4 |
| 2014/0305948 A1 * | 10/2014 | Gantillon | A47J 36/025 |
| | | | 220/573.2 |
| 2015/0144261 A1 | 5/2015 | Thornton et al. | |

FOREIGN PATENT DOCUMENTS

| | | |
|---|---|---|
| WO | WO 92/08609 A2 | 5/1992 |
| WO | WO2010021708 A2 | 2/2010 |

OTHER PUBLICATIONS

Güranda, "The Effects of Seam Parameters on the Stiffness of Woven Fabrics," TEKSTILK ve KONFEKSIYON, Jul. 1, 2009, 19.3, pp. 242-247.

ISA/US, Form PCT/ISA/210, English language International Search Report for International Application PCT/US2019/047249, Nov. 12, 2019 (2 pages).

ISA/US, Form PCT/ISA/237, Written Opinion of the International Searching Authority, for International Application PCT/US2019/047249, Nov. 12, 2019 (7 pages).

JPO, Office Action for Japanese Patent Application No. 2021-509176, Issued May 30, 2023 (6 pages).

* cited by examiner

NONSTICK COOKWARE MATERIALS, AND METHODS FOR MANUFACTURE AND USE

CROSS REFERENCE TO RELATED APPLICATIONS

This application claims priority to, and the benefit of: U.S. Patent Application Ser. No. 62/719,799, filed on 20 Aug. 2018; U.S. Patent Application Ser. No. 62/829,706, filed on 5 Apr. 2019; and U.S. Patent Application Ser. No. 62/834,189, filed on 15 Apr. 2019. The co-pending provisional applications are each hereby incorporated by reference herein in its entirety and is made a part hereof, including but not limited to those portions which specifically appear hereinafter.

BACKGROUND OF THE INVENTION

Field of the Invention

This invention is directed to heat resistant polymer materials and product uses thereof, including cookware, particularly nonstick polymer cooking surfaces, materials, composites, and coatings, and/or replaceable and/or recyclable inserts/covers.

Discussion of Related Art

Nonstick cookware, including, without limitation, pots, pans, baking sheets, cake/bread pans, etc., have been popular for commercial and residential use for many years. Exemplary common cookware include fluoropolymer, e.g., polytetrafluoroethylene, coated metal cookware. Over time, the polymer coating tends to flake off the metal, or otherwise lose effectiveness due to residue buildup. Residential users tend to simply replace the entire cookware item, and commercial/industrial users often send their cookware for recoating. There is a continuing need for improved nonstick cookware, and for cookware without metal which holds heat after removal from oven leading to uneven cooking.

Polymer coated non-metal cooking sheets and baskets are known for heating foods and toasting sandwiches in ovens. Such temperature resistant sheets or baskets are particularly useful for quickly toasting sandwiches in high speed or rapid cook ovens, such as are available from TurboChef Technologies, Inc. (Carroltton, Texas) and/or Welbilt, Inc. (United Kingdom). High speed ovens typically incorporate several cooking elements, such as selected from hot air, infrared, radiant, conductive, steam, and/or a microwave heating elements.

While being useful for toasting or cooking food items, known polymer coated cooking sheets and/or cooking baskets/trays often lack the desired food support, durability, cleanability, heat dissipation (for proper cooking and/or operator safety), and/or appearance for commercial restaurants, particularly when food is prepared in view of customers. Also, these known sheets and baskets are typically removed from an oven with a pizza paddle or equivalent, which does not generally provide the fully desired stability for the removed sheet or basket. U.S. Pat. No. 8,857,652, incorporated by reference herein, discloses a cooking support to remedy these issues. There is also a continuing need for an improved cooking apparatus and materials for flexibility in cooking various food items in high temperature/high speed ovens.

SUMMARY OF THE INVENTION

A general object of the invention is to provide an improved nonstick materials and products thereof, such as cookware, e.g., a pan, basket, tray, sheet, bakeware, and accessories (e.g., lids, covers, and oven or countertop racks, etc.), particularly for use in high speed, rapid cook, and/or conventional ovens. Embodiments of the apparatus provide for easy placement in and removal from ovens, provide structure to hold and support removable cooking inserts of various shapes and sizes, cool down quickly and do not hold heat (e.g., mostly or fully free of metal), and can withstand temperatures over 375° F. (191° C.) for an indefinite period of time, and more preferably 500° F. (260° C.).

Another general object of the invention is to provide nonstick, reusable cookware/bakeware including at least a polymer cooking surface. The cooking surface can be formed of a 'nonstick' polymer, contain a non-stick additive as part of the polymer matrix, dip or spray coated with a nonstick polymer, and/or be covered with a removable nonstick polymer surface insert. Various polymers are available for these applications.

Exemplary nonstick surface polymer materials according to embodiments of this invention include melt-processible fluoropolymers, such as perfluoroalkoxy alkanes (PFA), TFE/perfluoromethylvinylether copolymer (MFA), or fluorinated ethylene propylene (FEP). Additionally blends of fluoropolymers, such as MFA, PFA, FEP, ECTFE, and PTFE, as well as, non-stick, silicone-containing materials can also be utilized.

Embodiments of this invention provide an improved woven/plastic/nonstick laminate material with structural benefits, and that is pressable or otherwise moldable in a forming method to provide shaped cookware or other nonstick items/components. Exemplary plastics for these embodiments include engineered resins. Engineered resins and thermoplastics are used today in fabrics and conveyor belts. These are resins typically blended with fluoropolymer and or silicone. The engineered resins are used for barrier or abrasion, not structure, as fluoropolymer or silicone incorporation generally prevents structural use of engineered resin. The material composite of this invention can incorporate 100% engineered resin until the woven glass substrate is sufficiently saturated such that, when molded, the engineered resin is consolidated to create a structural component. Another feature is that the invention bonds a nonstick material, such as a fluoropolymer or silicone to the 100% engineered resin. This provides good bond strength.

The invention includes a composite material, including a flexible substrate impregnated with a heat resistant polymer material and coated with a nonstick coating, wherein the composite material has a structural rigidity when cured. The composite material is pressable or moldable into a predetermined configuration before or during curing and holds the predetermined configuration with the structural rigidity when cured. The predetermined configuration is a consumer good, preferably a cookware item, or machinery (e.g. vehicle) component.

Embodiments of this invention include surface coatings, such as applied by spray or dip coating, or as a film or coated fabric. In additional embodiments of this invention, the cooking surface is first dip or spray coated and then covered/laminated with a casted or laminate film, or coated fabric, of one or more of, for example: silicone materials and/or fluoropolymers, such as melt-processible fluoropolymers or blends of PTFE and melt-processible fluoropolymers. The spray coating and casted film, etc. desirably interlock together during curing, providing stronger bonding to the underlying cookware surface.

The invention further provides a woven/plastic/nonstick laminate material with structural benefits, and that is pressable or otherwise moldable in a forming method to provide shaped cookware or other nonstick items/components. The material composite of this invention can incorporate a flexible and/or fibrous material impregnated with 100% engineered resin such that, when molded, the engineered resin is consolidated to create a structural component retaining the molded shape.

Embodiments of this invention include separately formed surface inserts applied over cooking/baking surfaces of the cookware, and are desirably replaceable and recyclable. The inserts can be applied by suitable means, such as being clipped, snapped, press fit, or otherwise nested to the cookware over the cooking surface. The insert can be applied to new types of cookware, or can be retrofitted to refresh nonstick surfaces of existing residential, commercial, or industrial cookware. When the surface insert is nearing an end of life, the insert can be removed and replaced, and desirably returned to the manufacturer for recycling. The invention includes methods of subscription services for regular replacement and recycling of surface inserts.

Another general object of the invention is to provide an improved cooking support apparatus, e.g., a basket, tray, or sheet, particularly for use in high speed, rapid cook, microwave and/or conventional ovens. Embodiments of the apparatus provide for easy placement in and removal from ovens, provide structure to hold and support removable cooking inserts of various shapes and sizes, cool down quickly and do not hold heat (e.g., mostly or fully free of metal), and can withstand temperatures over 375° F. (191° C.) for an indefinite period of time, and more preferably 500° F. (260° C.) and most preferably being able to withstand temperatures of up to 600° F. (315° C.), and in certain applications, up to 800° F. (426° C.). The cooking inserts can be nonstick themselves, coated, or desirably fitted with a removable surface insert discussed above.

Embodiments of this invention include a food support apparatus for holding food items during cooking in an oven. The food support of this invention includes a reinforcement structure, such as a support frame. One or more fixed or moveable and/or removable cooking inserts extend across the support frame, and designed for one or more different types of cooking and/or food. Many and preferably all of the apparatus components are formed of, or at least include, high temperature resistant materials, such as high temperature or heat resistant polymers.

Embodiments of this invention can also hold a flexible sheet-like insert on a bottom support surface of the support frame. Such inserts can be a mesh or solid film substrate, such as held at an outer edge, or a stone, metal, porcelain, and/or ceramic sheet, or pan insert.

The support frame, cooking inserts, and/or mesh/solid substrate can be formed of a material including mica, wollastonite, fiberglass, nylon, polyester, aramid, polyethylene, polyolefin, ceramic, metal, liquid crystal polymer (LCP), polysulfone, polyketone, polyphenylene sulfide, polyphenylene sulfone, polyimide, polyamide imide, fluoropolymer, or combinations thereof. The support frame, components thereof, and/or inserts for the frame can be thermo-formed, extruded, molded, or 3D printed of or including a heat resistant polymer. As used herein, "heat resistant" refers to the ability of a material to withstand continuous-use temperatures of about 400° F. (about 204° C.) or greater. The heat resistant polymer can be neat or reinforced, and can include, for example, a fluoropolymer (e.g., PTFE, FEP, PFA, MFA®, ETFE), a fluoroelastomer, a silicone rubber, a silicone resin, a urethane rubber, a urethane resin, a polyketone, a polyether ether ketone (PEEK), a polyamide-imide (PAI), a polyphenylene sulfide (PPS), a polyphenylsulfone (PPSU), a liquid crystal polyester (LCP), a polyether sulfone (PES), an epoxy, or combinations thereof.

In embodiments of this invention, the cooking inserts could also be formed of a disposable or single use material made from pulp materials, such as bagasse, wheat straw, paper, wood, hemp, and/or bamboo. These inserts are capable of withstanding single cook cycles and thus are considered highly relevant for certain uses.

The food support of this invention, which can be formed, for example, as a cooking basket or tray or a cooking sheet, is useful for placing and removing food items from, and holding food items while in, an oven. The food support of this invention is desirably durable for multiple heating cycles, high temperature and water resistant, easy to clean, stain resistant, and dissipates heat quickly; all while desirably not having any or much effect on the cooking of food. The food support can include a solid bottom substrate sheet, such as to prevent liquids from dripping on heating elements, or a mesh substrate sheet. The multiple cooking inserts useable with the support frame provide the ability to cook different food items and provide, for example, the desired food browning, toasting and/or heating characteristics.

Other objects and advantages will be apparent to those skilled in the art from the following detailed description taken in conjunction with the appended claims and drawings.

DETAILED DESCRIPTION OF THE INVENTION

Figure 1:
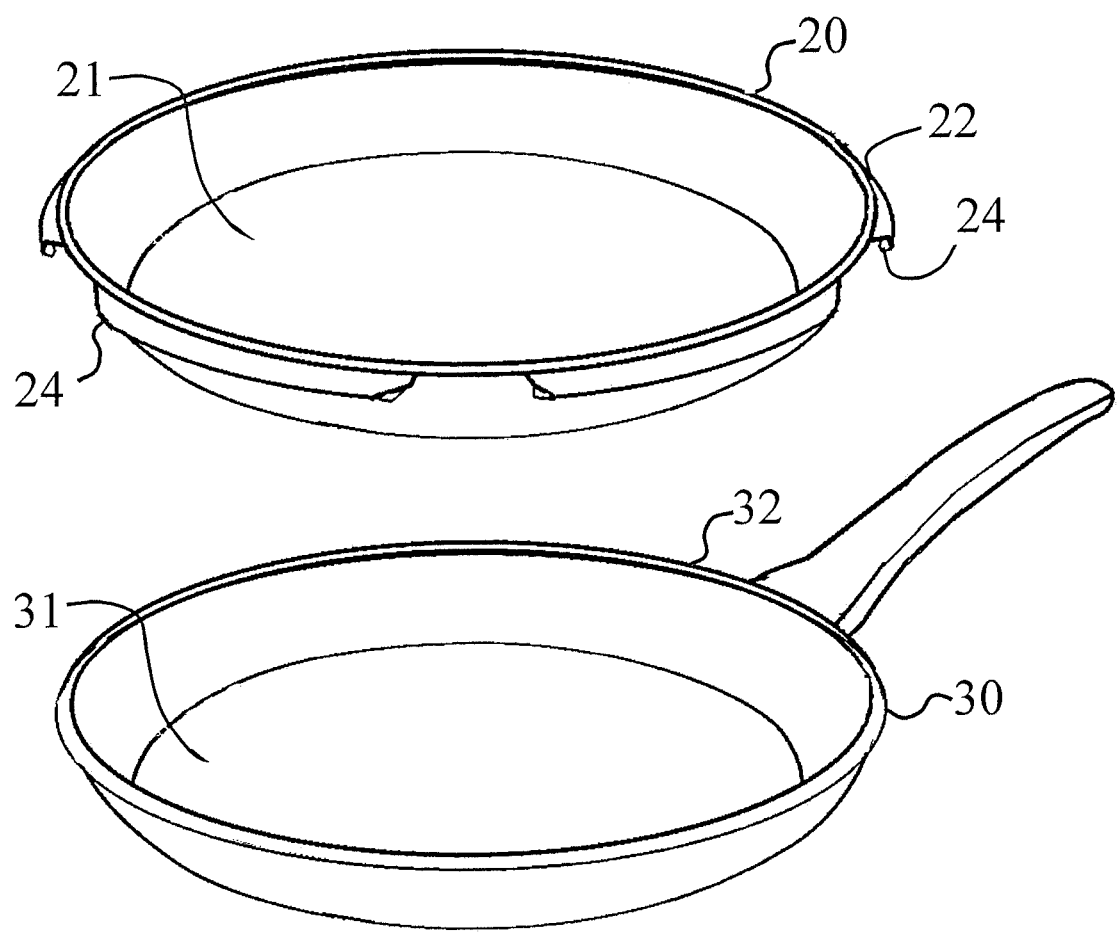
FIG. 1 shows a cooking surface insert for a pan, according to one embodiment of this invention.

The invention provides heat resistant and/or nonstick materials, and products thereof, including cookware including at least a non-stick polymer cooking surface. As used herein, cookware includes, without limitation, various pots, pans, sheets and baskets, and bakeware such as cake/bread pans and cooking sheets, etc., and also components for cooking devices/appliances. The cookware includes a nonstick cooking surface formed of, or otherwise covered/coated by, a polymer material. Suitable polymer materials include, without limitation, silicone and fluoropolymer materials.

The invention includes improved heat resistant materials and products, such as vehicle components and cookware, particularly for use in high speed, rapid cook, and/or high temperature conventional ovens. In several preferred embodiments, the products are fully made of a polymer material, and substantially or completely free of metal, and thus nonmetallic. Any suitable high heat resistant polymer can be used, as described above. References to "nonmetallic" means that the entire product, and/or each layer or element, is devoid of metal.

In embodiments of this invention, the cookware and/or cooking surface polymer material is a heat resistant polymer. As used herein, "heat resistant" refers to the ability of a material to withstand continuous-use temperatures of about 400° F. (about 204° C.) or greater. The heat resistant polymer can be neat or reinforced, and can include, for example, a fluoropolymer (e.g., PTFE, FEP, PFA, MFA®, ETFE), a fluoroelastomer, a silicone rubber, a silicone resin, a urethane rubber, a urethane resin, a polyketone, a polyether ether ketone (PEEK), a polyimide-imide (PAI), a polyphenylene sulfide (PPS), a polyphenylsulfone (PPSU), a liquid crystal polyester (LCP), a polyether sulfone (PES), an epoxy, quartz, fluorinated materials, such as fluorinated mica, combinations thereof, and/or other nonstick, easy clean materials.

To form products of embodiments of this invention, pelletized glass-filled or other polymer material can be melted in a screw extruder and then molded in any suitable molding process to obtain the cookware form. Exemplary molding processes include, without limitation, injection molding, stamping, and/or thermoforming, desirably to form the integral cookware piece. Additives can also be included to promote desirable properties. Exemplary additives include materials that reduce the thermal mass and enable rapid cooling, such as hollow glass spheres, chopped fiberglass, mica, etc.

In embodiments of this invention, the product is formed from or including a melt-processable fluoropolymer. Exemplary melt-processable fluoropolymers include, without limitation, perfluoroalkoxy alkanes (PFA) or fluorinated ethylene propylene (FEP), homopolymers or copolymers of PTFE, or combinations thereof. In embodiments of this invention, an entire cookware, or at least cooking sections/surfaces thereof (e.g., for cooking surface coatings or add-on handles, etc.), are molded from the melt-processible fluoropolymers. Exemplary embodiments have a 20 mils or greater thickness, and can hold the molded shape during cooking cycles in high temperature ovens.

Embodiments of this invention provide or include a polymer surface covers or insert, particularly for cookware items, also desirably formed of a melt-processable fluoropolymer. Due to the cost of, for example, melt-processible fluoropolymers, the surface inserts provide a thin, snap on and or draping (capping) cover material for providing metal or polymer cookware with nonstick properties, and/or reconditioning older cookware.

FIG. 1 illustrates a polymer surface insert 20 for covering a food support surface 31 of pan 30. The pan 30 can be a metal pan or, for example, a PTFE pan losing its nonstick surface (e.g., due to flaking or carbonized deposits). The surface insert 20 matches a pan shape and includes a cooking surface 21 that corresponds to the support surface 21. The surface insert 20 includes a clip or snap structure 24 along an upper rim 22. The snap structure 24 of FIG. 1 is designed to removably snap around the upper lip 32 of the pan 30.

The cooking surface inserts of embodiments of this invention apply over cooking/baking food support surfaces of the cookware, such as by clipping, snapping, press fit, or otherwise being nested, and are desirably replaceable and recyclable. The insert can be applied to new types of cookware (e.g., FIG. 30), or can be retrofitted to refresh nonstick surfaces of existing residential, commercial, or industrial cookware. When the polymer cookware or surface insert of this invention is nearing an end of life (e.g., due to deposit buildup), the item can be desirably returned to the manufacturer for recycling. Embodiments of this invention include methods of adding and removing surface inserts, and/or subscription services with the seller/manufacturer for regular, periodic replacement and recycling of the cookware and/or inserts.

The present invention further provides an improved woven/plastic/nonstick composite or laminate material with structural benefits, and that is pressable or otherwise moldable in a forming method to provide shaped cookware, cooking surface inserts, or other nonstick items/components. Embodiments of the material composite of this invention can incorporate 100% engineered resin as the plastic material until the woven glass substrate is sufficiently saturated such that, when molded, the engineered resin is consolidated to create a structural component. Another feature is that the invention desirably bonds the fluoropolymer or silicone to the 100% engineered resin. This is easily done and with good bond strength.

Figure 2:
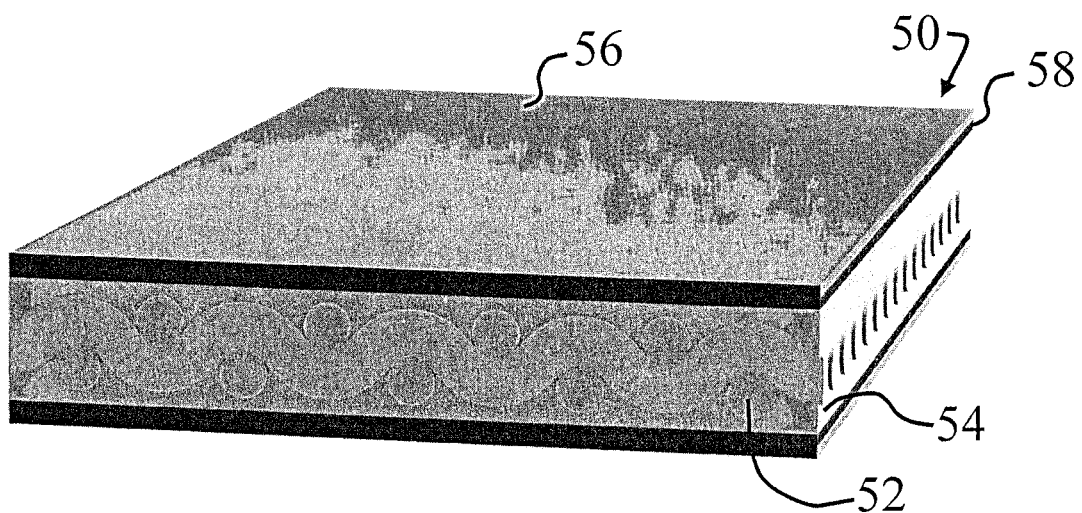
FIG. 2 shows a composite material, according to one embodiment of this invention.
Figure 3:
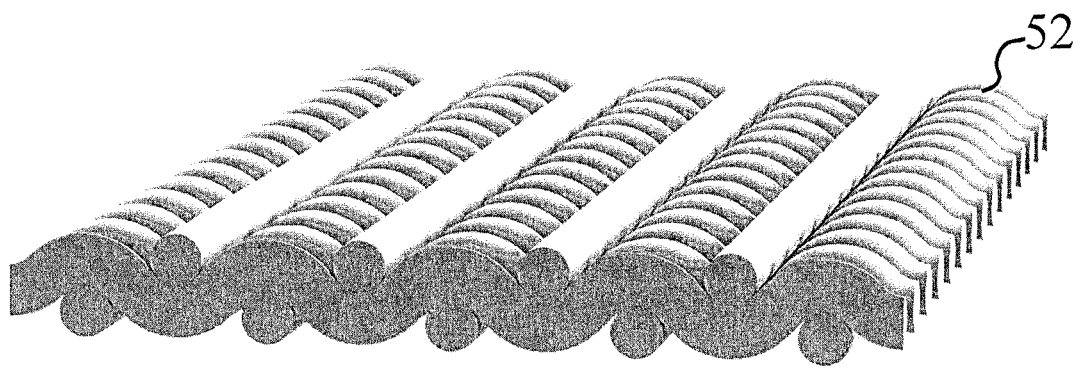
FIGS. 3-5 shows the layers and building of the composite material of FIG. 2.
Figure 4:
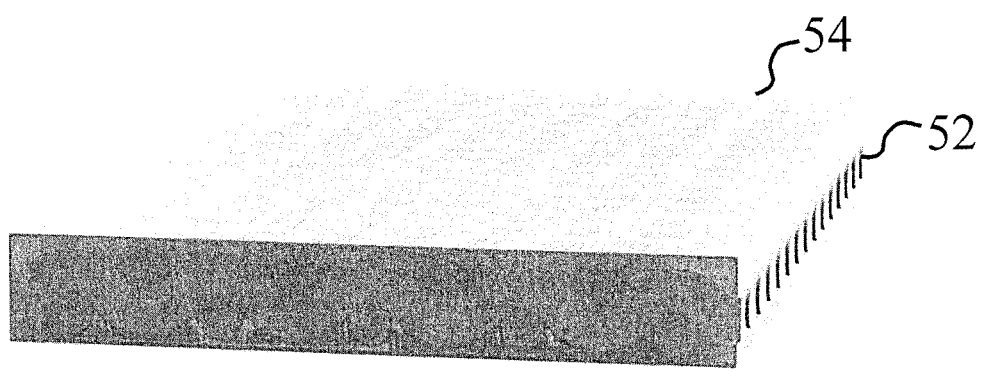
Figure 5:
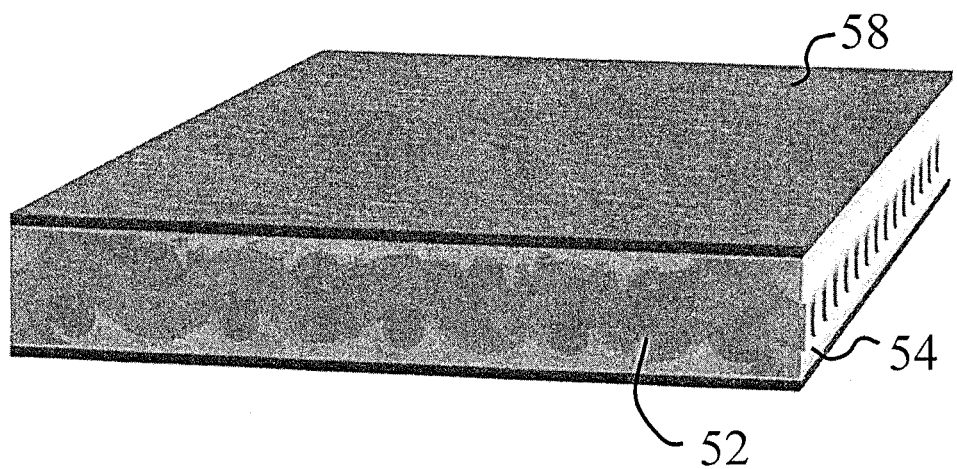

Embodiments of this invention provides high temperature (≥375° F.) resistant, formable composites. As shown in FIG. 2, a composite 50 can be formed by impregnating and/or coating one or more substrates 52 with a plastic material 54. Exemplary flexible substrates include woven substrates, non-woven substrates, open mesh/leno weave substrates, braided substrates, and/or unidirectional fabrics, such as made using fiberglass or other suitable fibrous materials, such as Kevlar, Nomex, carbon fiber, quartz fiber, PEEK, PAEK, PPS, PES, PPSU, LCP, and/or PAI fibers, or combinations of such fibers or yarns. Exemplary plastic materials include engineered thermoplastic materials and blends thereof. The engineered thermoplastic desirably acts as a support and structure for the composite once molded.

Figure 6:
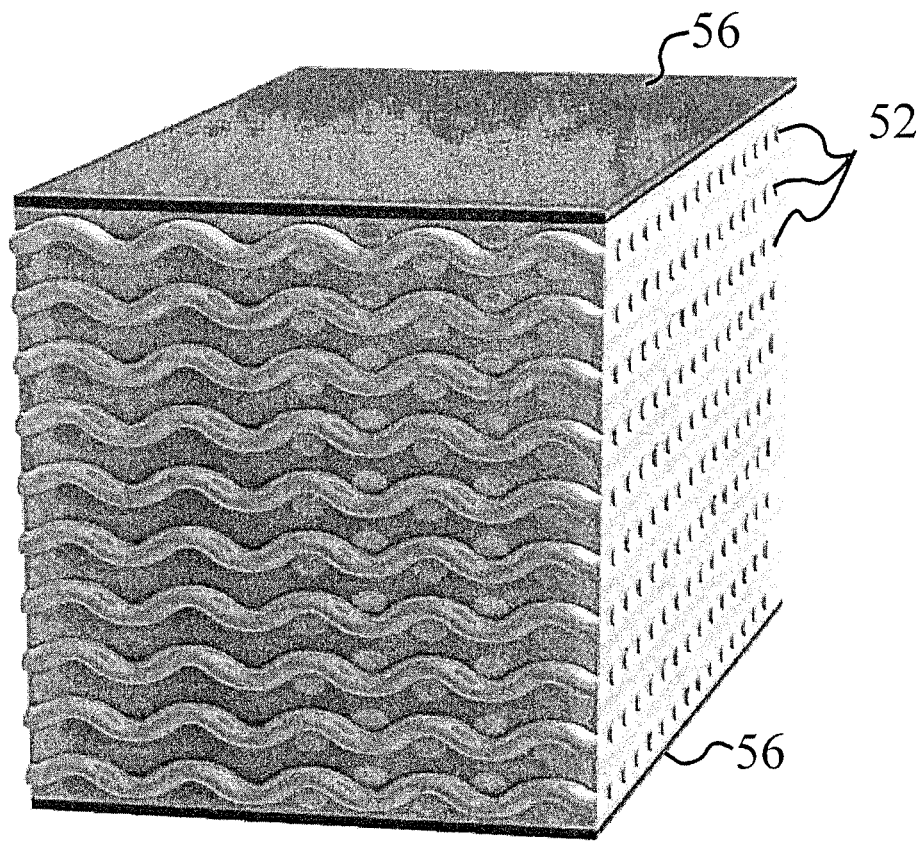
FIG. 6 shows a multilayered composite material, according to one embodiment of this invention FIGS. 7-12 each show an exemplary molded cookware, according to embodiments of this invention.

Various and alternative sizes, shapes, and configurations are available for the plastic impregnated/coated substrate. For example, more than one substrate layer can be impregnated. In addition, more than one separately impregnated substrate can be laminated together prior to top coating. The multiple layers can be the same or different substrate materials, such as, for example, a coated woven can be laminated to a coated nonwoven on one or both sides. The type and number of layers can be adjusted for rigidity, depending on need. For example, FIG. 6 shows a laminate composite with ten layers of resign impregnated substrate, which can provide the desired rigidity for applications such as the oven components of FIGS: 14-16. The desired number of layers, such as more than three, desirably, more than five, more desirably more than eight, and preferably at least ten, are laminated without the nonstick coating, and then, if needed, covered with the non-stick fluoropolymer film or a coated fabric, etc., to one or both sides of the heavily laminated product.

A nonstick coating 56, such as of the materials disclosed herein, is applied over top of the engineered thermoplastic coating 54. The nonstick coating 56 is desirably capable of being easily cleaned, and is chemical resistant, abrasion resistant, and stain resistant. Exemplary nonstick materials include fluoropolymers and silicone rubbers and resins. Once formed, the composite material can desirably withstand temperatures of greater than 375° F. (191° C.) continuous, and up to 800° F. (426° C.), depending upon the engineered resin utilized.

The nonstick coating 56 can be applied over the engineered resin 54 by, for example, dip, spray, curtain, or powder coating. The nonstick coating 56 surface can be applied by laminating a cast, extruded, skived, or PTFE coated fabric to the surface of the engineered resin. The nonstick coating 56 can be applied before forming or after forming a molded part, described further below.

In embodiments of this invention, a microwave absorbent material or coating 58 can be applied before the nonstick coating 56 is applied, or as a component of the nonstick surface application. As with the nonstick coating 56 application, this can be applied as a coating or laminated material, in same manner as mentioned above.

The composite materials of embodiments of this invention are useful in forming molded objects, such as consumer goods and cookware. According to some embodiments of this invention, the forming process begins with a substrate, such as a woven fiberglass substrate, which can include plies of coated linear strand fiberglass. The substrate is saturation coated with a solution of dissolved or suspended plastic, such as PAI, PPS, PEEK, PPSU, PES, or combinations thereof, or other suitable plastics known for high temperature use. Multi-pass applications of the coating can be used to adequately saturate the fibers, and build adequate weight for flow and forming. The plastic coated substrate is preferably dried and prepared to a pre-preg (pre-impregnated) condition, similar to that performed for epoxy resins on fiberglass used in printed circuit boards.

A top coat of PTFE or other nonstick material is applied to one or both sides. The fluoropolymer coating provides mold release functionalities during forming, and provides a high performance release finish for cooking (similar to pan coatings). The coating can be applied by, for example, a heavily coated single ply coating and/or multi-ply lamination of lighter weight woven or linear strand fiberglass.

The dried, but not cured, composite material can be wound into a roll and stored for further processing from the roll into an automated forming press, or sheeted to discrete sizes for manually loading into a press. The forming presses typically include heated platens to which male and female forming dies are attached, with temperatures generally adjustable to 600° F. (315° C.) or higher. The material is formed at a temperature at or above the glass transition temperature (Tg) of the blended engineered resins. Pressures are also generally adjustable and vary according to size. Testing has shown reasonable results as low as 30 psi in an air load press capable of 3 tons total applied pressure. Larger part sizes and multiple part molds may require significantly more pressure. Matched form molds, or coining, is a form of compression molding requiring higher pressures; for proposed objects of this invention, 30- to 50-ton hydraulic presses are likely needed.

After forming the edges may be trimmed in a die cutting station, such as "steel rule die" or "clicker press". The formed parts are post cured in a batch oven with a stepped temperature cycle to obtain higher operating temperatures and to cure the PTFE and enhance the bond of the PTFE to the tray. The post forming processing can be used to crosslink, chain extend, or otherwise cure the engineered polymer. Also, the engineered polymer could be post-cured to temperatures capable of fusing fluoropolymers.

In embodiments of this invention, the material can be cured during the molding process if molding is done at high enough temperature. Another option is to post cure in an inline process such as a hot air or infrared oven on a conveyor. In embodiments of this invention, molding is performed between 640° F. (338° C.) and 800° F. (426° C.). At these temperatures, the process can complete and no post cure is needed. The higher temperature allows the fluoropolymer to cure at a same time as molding and thus reduces the need for post cure.

In embodiments of this invention the composite is formed including a woven substrate of a high temperature thermoplastic material (e.g., capable of continuous operation at temperatures of 375° F. (191° C.) or higher), such as PEEK, PAEK, PPS, PES, PPSU, LCP, and/or PAI, that can be coated with additional compatible thermoplastic material, and that coating could include chopped fiber or other reinforcement and then the material could be top coated with a nonstick surface.

Also, for additional dimensional strength, a non-woven, woven, or unidirectional fabric consisting of a reinforcement material capable of withstanding the operating temperatures of 375° F. (191° C.) or higher continuously could be laminated to the thermoplastic woven material before or during the additional coating passes mentioned above.

The composites of embodiments of this invention desirably have or include a rigid molded shape, and are insulative in nature (i.e., does not want to conduct heat), durable, nonstick, low friction, cleanable, chemical resistant, corrosion resistant, heat resistant, and/or capable of bleeding heat quickly. Also, desirably, the substrate weave is capable of conforming to shapes during a compression or thermoforming process such that it will not tear, wrinkle, or fold. The composite material and forming of this invention is useful in cookware and cooking appliance components such as, without limitation, bakeware, microwave applications, and oven cooking (convention, conveyor, rapid cook, brick/stone, accelerated cooking, etc.). The composite material and forming of this invention is useful in other consumer or industrial goods/applications, and/or automotive applications such as, without limitation, providing corrosion and/or chemical resistance or thermal resistance or insulation to parts, such as tubing, fluid containers, oil pans, and/or exhaust parts. These properties also make the material useful in forming aerospace and/or defense parts.

Figure 7:
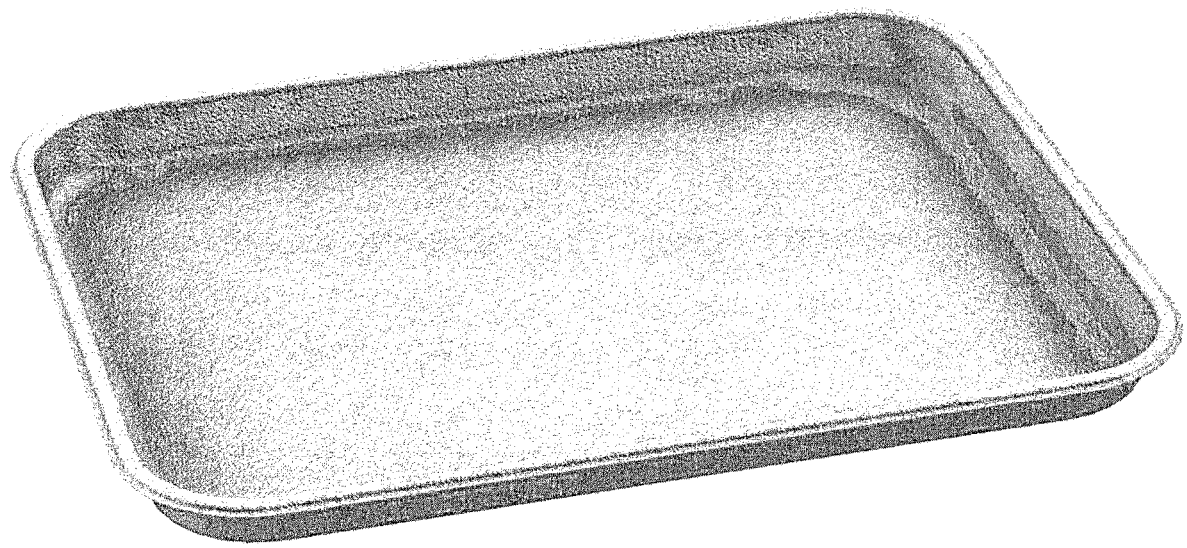
Figure 8:
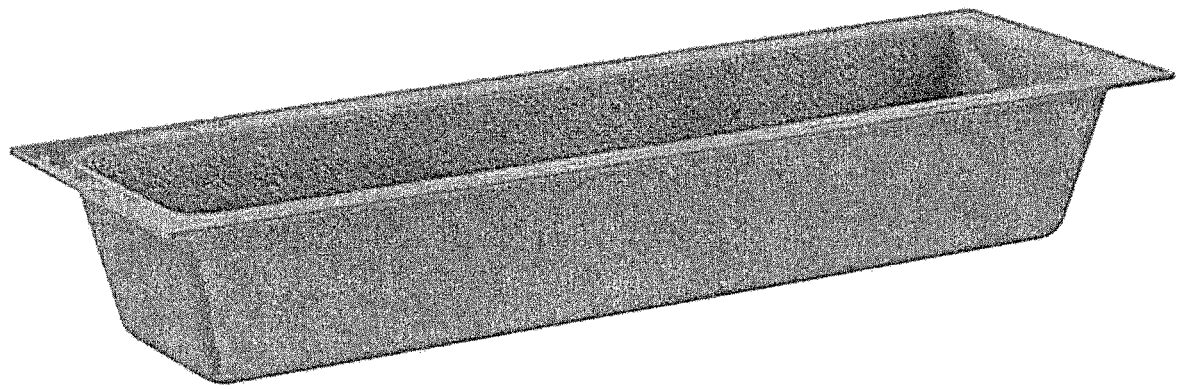
Figure 9:
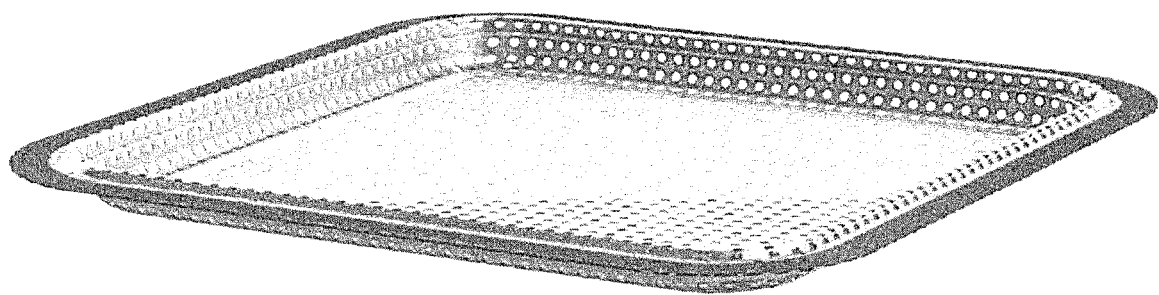
Figure 10:
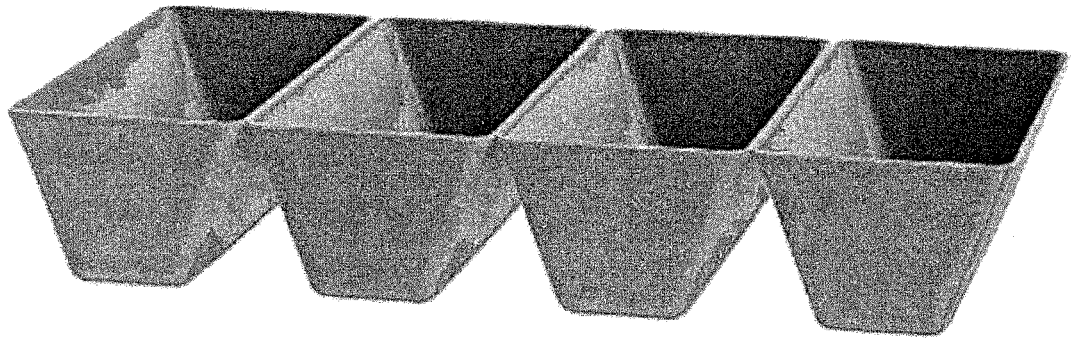
Figure 11:
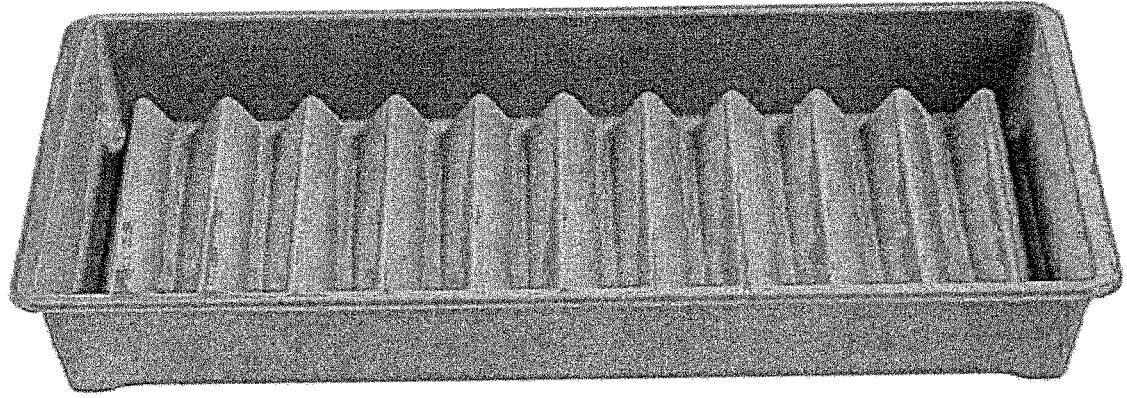
Figure 12:
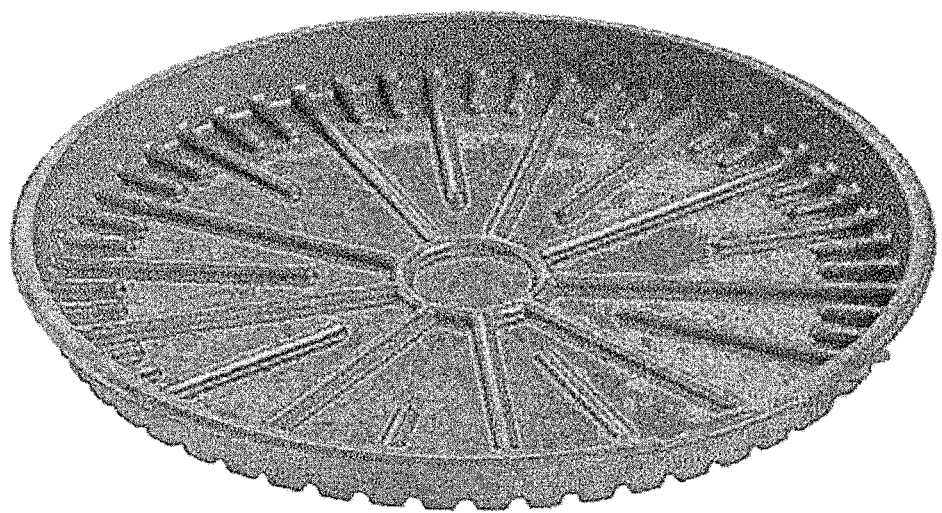
Figure 13:
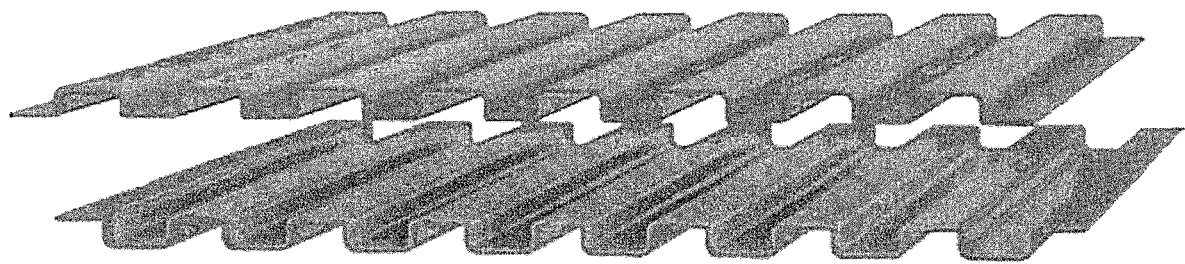
FIG. 13 shows a panini press surface, according to embodiments of this invention.

Exemplary cookware pressed or molded from the laminate material include cooking sheets or trays, such as shown in FIG. 7, bread or cake pans, such as shown in FIG. 8, and/or baskets, trays, egg cooking pans, or cups, such as those shown in FIGS. 30-37. Other exemplary cookware includes bowls, cookie sheets, pizza pans, panini presses or grill pans, muffin pans, croissant pans, cake pans, pie pans, plates, covers, or other cookware accessory. FIG. 9 shows an embodiment of a pressed basket, including a plurality of perforated openings. FIG. 10 is a pressed bread-proofing tray or pan, including a plurality of proofing wells. FIG. 11 is a taco tray, including a pressed undulating surface, each V-shaped well for holding a taco. The tray is shown with side walls, but can be formed without, or with any side structure. FIG. 12 shows a pressed pizza pan, including an exemplary ribbed cooking surface. FIG. 13 shows a panini press surface, including an undulating or other ribbed surface. The panini press surface can be incorporated into a panini press to impart nonstick benefits.

Figure 14:
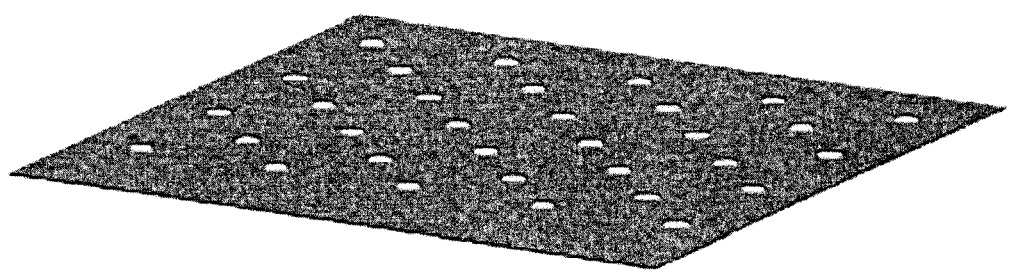
FIGS. 14-17 illustrate molded cookware components, preferably as cooking appliance components, according to embodiments of this invention.
Figure 15:
Figure 16:
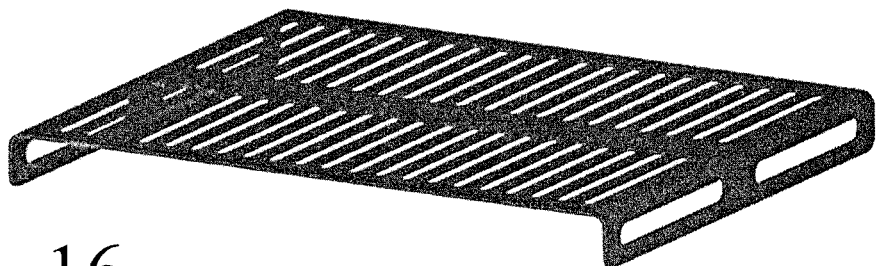
Figure 17:
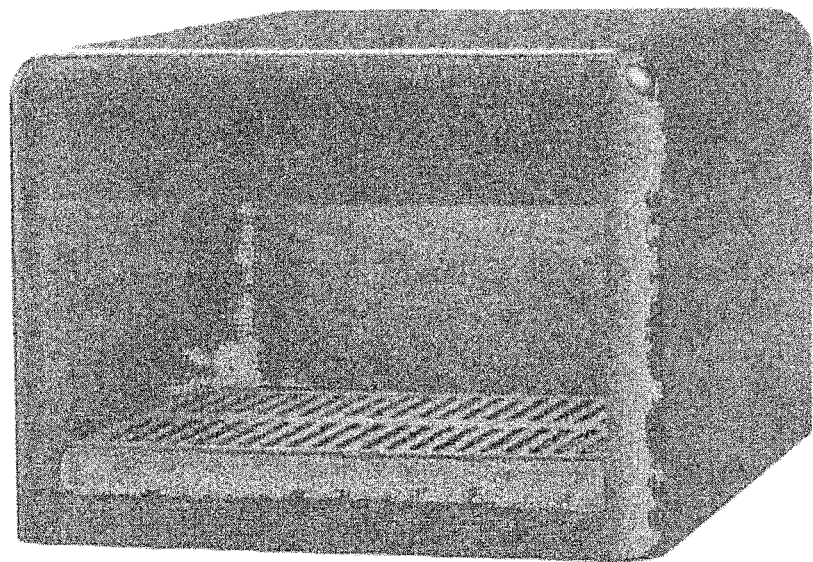

Cookware of this invention further includes cooking components, such as appliance components, preferably, but without limitation, oven, fryer, or toaster components. FIG. 14 shows an oven rack or other shelf structure. FIG. 15 shows a rail or bar that could be used in an oven, but not necessarily in direct contact with the food. Using the material of this invention to form oven components can provide the oven, etc. with easier cleaning, due to the nonstick surface. FIG. 16 shows an oven or toaster rack, and FIG. 17 shows the rack within a representative oven.

Thus the invention provides a laminate composite material that is formable by heated press or other stamp/press molding. By this invention, the nonstick coating can be applied prior to forming, thereby providing an efficient forming process, and allowing for storing and transfer of the material prior to pressing, stamping or otherwise molding.

Figure 18:
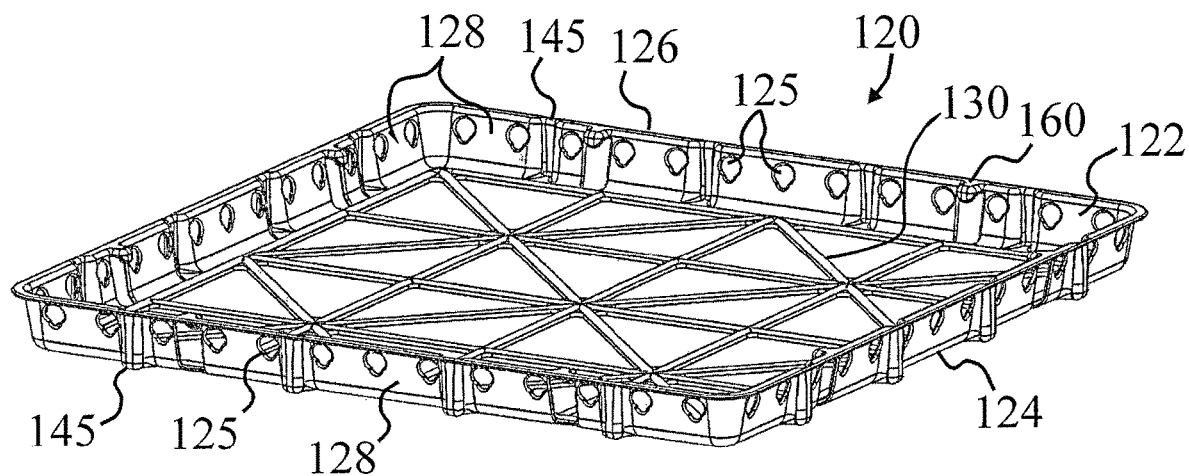
FIGS. 18-20 show a cookware support frame, according to one embodiment of this invention.
Figure 19:
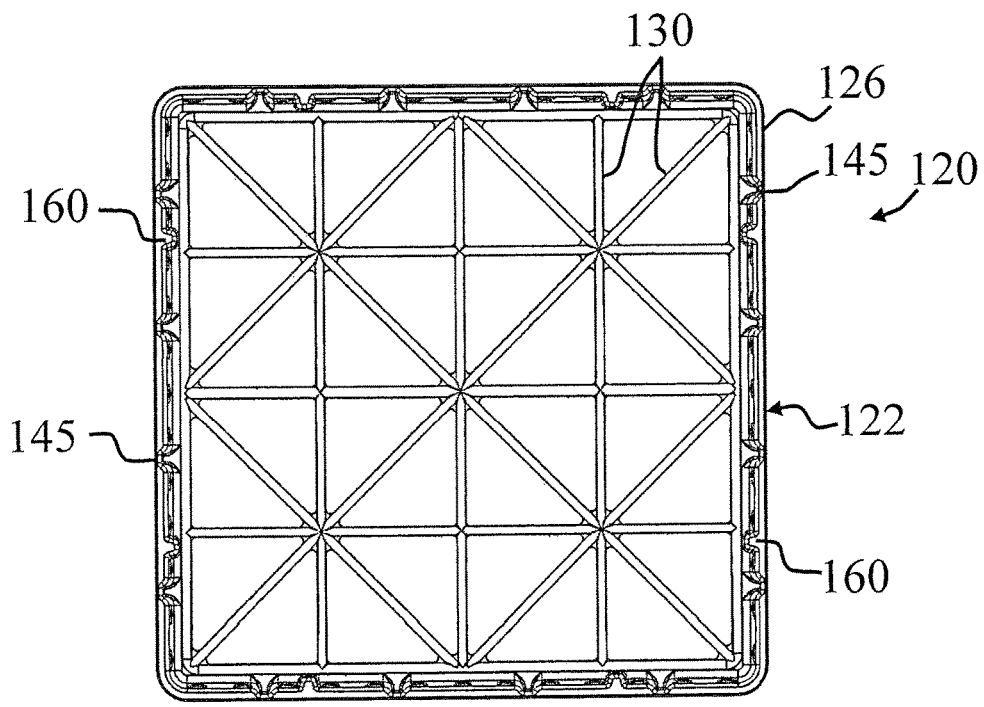

FIGS. 18 and 19 illustrate cookware according to one embodiment of this invention, such as a cooking basket including a support frame 120 of a cooking support. The support frame 120 includes a perimeter frame 122, formed in a square shape. The perimeter frame 122 has a lower edge or end 124 connected to an upper edge or end 126 by side walls 128. Crossbars 130, e.g., rails, etc., extend from the lower end 124 across the open interior. The support frame 120 is desirably formed as one integral piece, such as by thermoforming, injection or compression molding, 3D printing, stamping, or cutting. Alternatively, the support frame 120 can be assembled from one or more separate sides and/or crossbar(s).

Various and alternative sizes, shapes, materials, and configurations are available for the support frame of this invention. For example, the support frame can be round, rectangular, or any suitable shape. Support frame length, width and/or height can vary depending on need. In one embodiment of this invention, the length and/or width is about 4 inches to 20 inches, more desirably about 12 inches to 15 inches, and preferably between about 13 inches to about 14 inches. For example, the food support or substrate can be 4, 6, 12, 13, 14, 15, or 16 inches square, or rectangular, such as 6 inches by 12 inches. Also, the open spaces between the cross bars can promote cooking, but can be replaced with a full or partial solid floor. Alternative crossbar patterns are also within the scope of the invention, depending on need.

Figure 20:
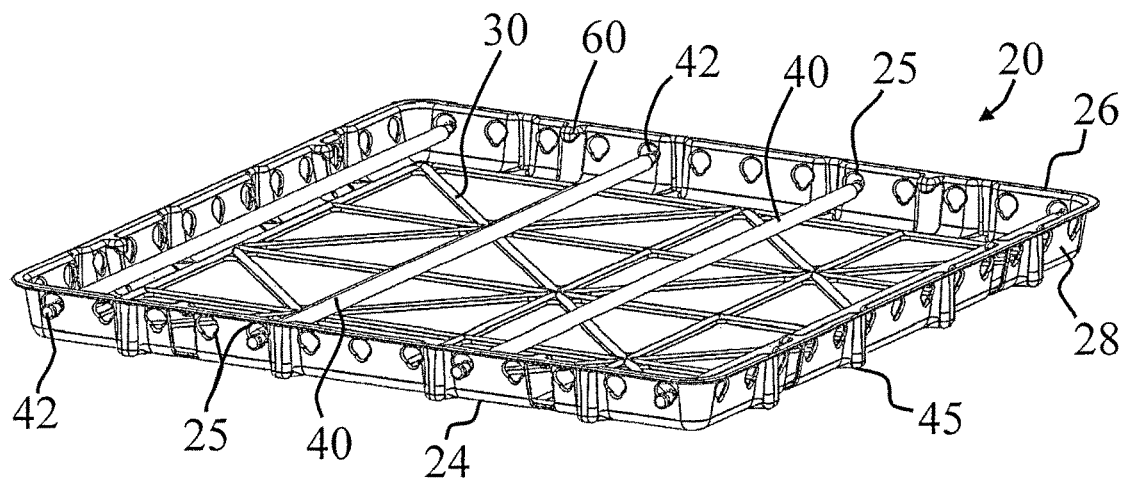

The support frame 120 includes an inner support structure for receiving and supporting/holding removable cooking inserts, desirably spaced above the crossbars 130. In the embodiment of FIGS. 18 and 19, the side walls 128 include a plurality of support openings 125. Each opening 125 is disposed aligned along an imaginary centerline from a corresponding opening 125 on an opposing side wall 128 and/or opposing side of the support frame 120. As shown in FIG. 20, insert supports, shown as support bars 140, extend in and through the correspondingly aligned pairs of the openings 125. Each of the opposing ends 142 of one of the support bars 140 is disposed in one of the aligned openings 125, whereby the support bar 140 extends across the inner length or width of the support frame 120. The support bar ends 142 and the openings 125 desirably have a matching shape that fit together to secure the support bar 140. For example, the illustrated ends have a circumferential groove or rim that fits in or against a notch at the bottom of each opening 125.

Figure 21:
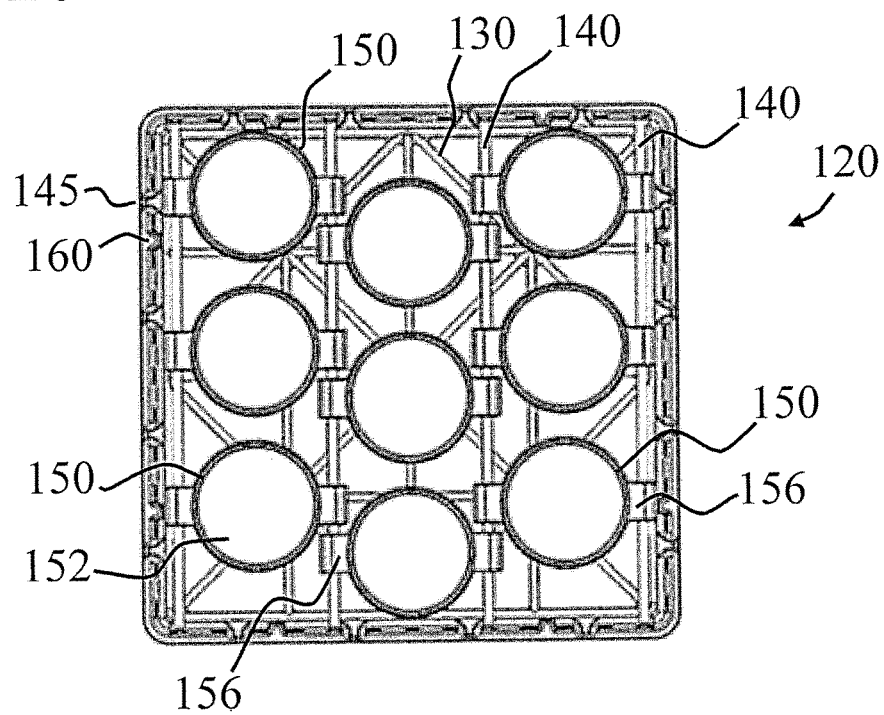
FIG. 21 shows cooking inserts in the support frame of FIGS. 18-20, according to one embodiment of this invention.

A plurality of the support bars 140 are placed in and spaced as need across the support frame to receive and support cooking inserts. FIG. 21 shows an embodiment with cooking inserts 150 seated on, and suspended between, parallel pairs of support bars 140. Each cooking insert 150 includes a cooking surface 152, desirably surrounded by one or more insert side walls 154, depending on shape, for receiving a food item for cooking, warming, etc. Each cooking insert includes opposing, outwardly extending protuberances 156 resting on the support bars, respectively, to suspend the insert 150. The protuberances 156 desirably have a shape to partially wrap around the outer circumference of the support bars 140, such as a partial hook shape and/or a semi-circular groove in the bottom matching the outer diameter of the support bar 140. The cooking inserts 150 can sit on, or snap or hook onto, the support bars 140, depending on need. Various and alternative sizes, shapes, materials, and configurations are available for the support bars of this invention. The support bars can be formed of a same or different material from the frame, such as the polymers or composites discussed above, or metal, ceramic, porcelain, natural fibers, or combinations thereof. The support bars can also include non-slip coatings to limit cooking insert movement.

Figure 22:
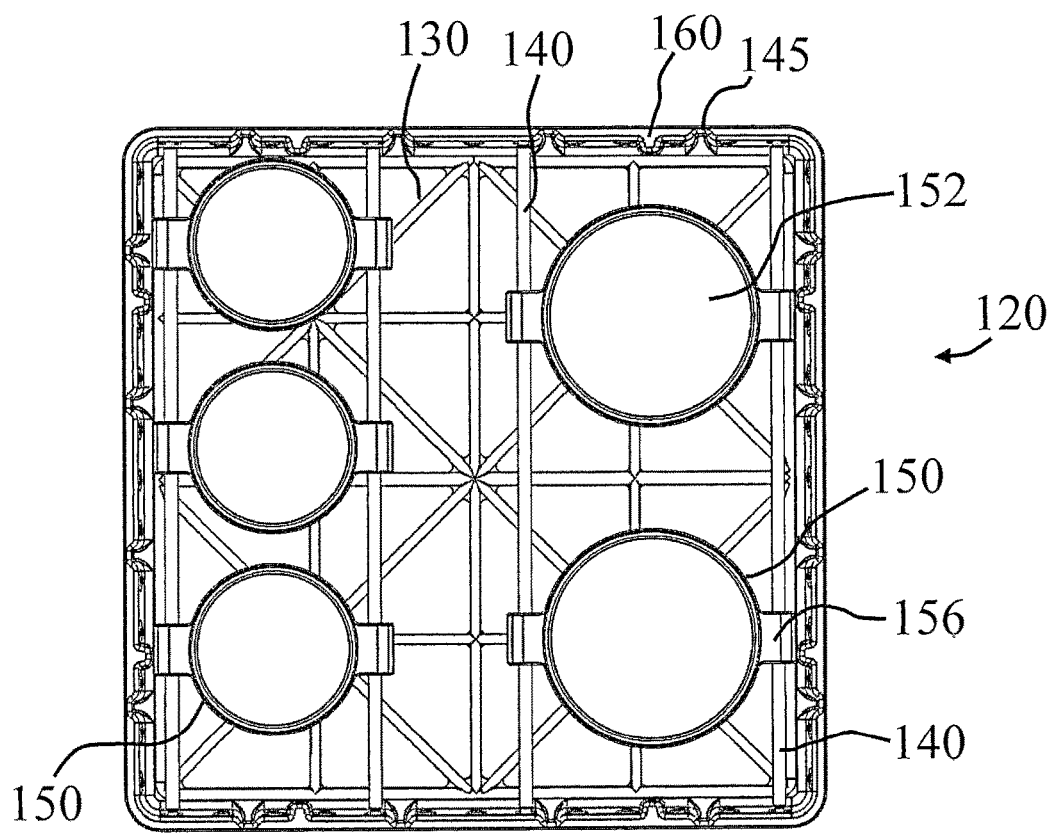
FIG. 22 shows cooking inserts in the support frame of FIGS. 18-20, according to one embodiment of this invention.
Figure 23:
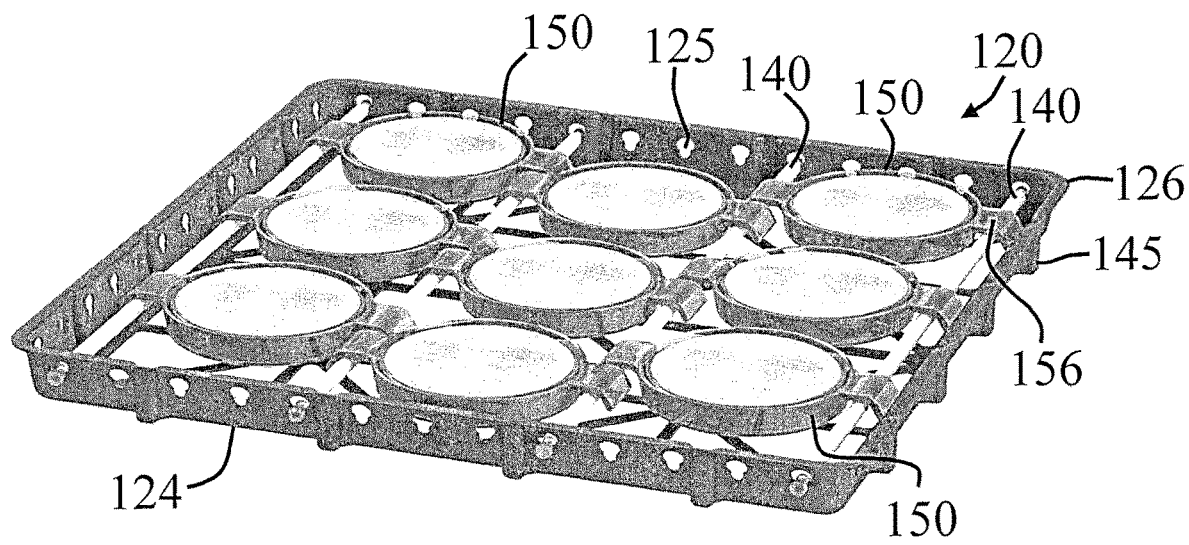
FIG. 23 shows use of cooking inserts in the support frame of FIGS. 18-20, according to one embodiment of this invention.

The cooking inserts of this invention are removable for washing and/or to substitute other inserts. The inserts provide for a food cooking system that allows for cooking of various food shapes, sizes, and/or types, with one base frame and, for example, separately purchasable inserts. FIG. 22 shows a cooking insert configuration where the support bars 140 have been reduced and rearranged to different openings 125 to allow for cooking inserts 150 of larger size. Various and alternative sizes, shapes, materials, and configurations are available for the cooking inserts of this invention. The illustrated cooking inserts are shown as round, but any shape can be used (square, rectangular, etc.). Even non-parallel shapes (e.g., triangles) can be used by providing suitable protuberances. The movable support bars allows for different sizes, and can support large square or rectangular baking sheets or griddles. The cooking inserts can each be single or multiple pieces, for example, a flat surface could have integral or attachable/removable wall elements. The cooking inserts can also optionally be interlocking together, and/or clipable or otherwise semi-permanently securable to the support rods to limit movement during use. The cooking inserts can be formed of a same or different material from the frame, such as the polymers or composites discussed above, or metal, ceramic, porcelain, or combinations thereof. The cooking inserts can have solid or mesh and/or flat or shaped bottoms, and can include non-stick or easy clean coatings, such as fluoropolymers (PTFE, PFA, MFA, FEP, ETFE, etc.) or silicones (silicone rubber, silicone resin, or silicone oil, etc.), and/or the cooking surfaces or surface inserts as discussed above for FIGS. 1 and 2. The material or coatings can also include microwave subsectors to enhance cooking. Without limitation, the cooking inserts can be designed to cook food items such as eggs, omelets, pancakes, pizza, bread, cookies, bacon, soup, fries, or for steaming of vegetables, eggs, rice, etc. FIG. 23 illustrates the cooking inserts containing eggs for cooking.

Figure 24:
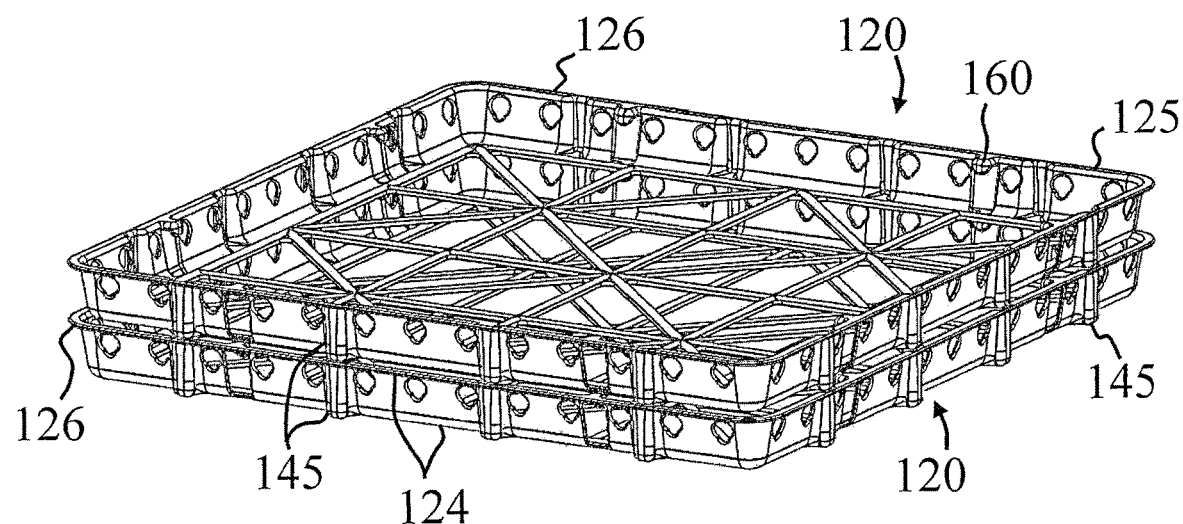
FIG. 24 shows stacked support frames, according to one embodiment of this invention.
Figure 25:
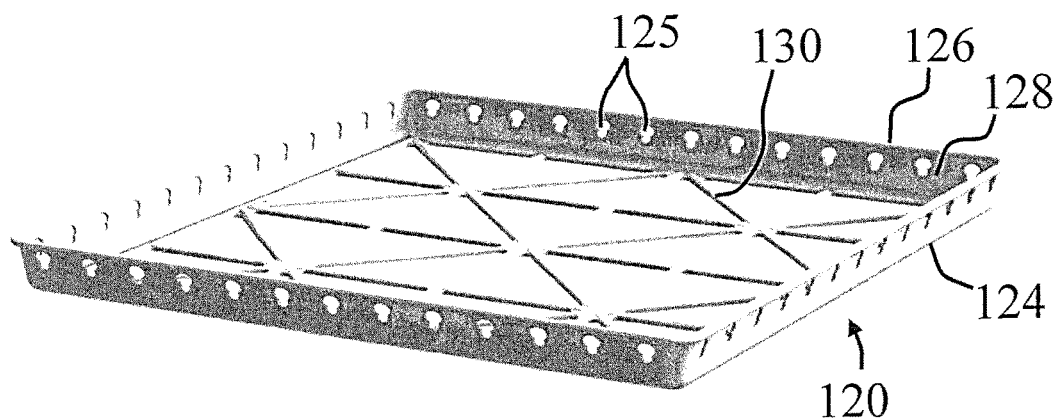
FIG. 25 shows a cookware support frame, according to one embodiment of this invention.

As shown in FIG. 24, the support frame 120 of FIG. 18 is stackable with another one or more like support frames 120. Various configurations to the upper end 126 and/or the lower end 124 can make the support frames 120 securely stackable. In embodiments of this invention, the cookware includes a form fit, or nesting structure, of corresponding or matching parts (e.g., male/female parts) to allow stacking. In the illustrated embodiment the support frame includes a plurality of stack elements 145 formed in the side walls 128, and extending between the lower end 124 and the upper end 126. The illustrated stack elements 145 are embodied as projections outwardly extending from the side wall 128 that allow the lower end 124 of one frame 120 to sit on a wider lip of the upper end 126, as shown in FIG. 24. The stack elements 145 extending the height of the side wall provide desirable support to the side walls 128, and can form a notch in the upper end 126 to receive a bottom side of another stack element 145 to secure the baskets in the stacked configuration. FIG. 25 shows a support frame 120 without stacking elements.

Figure 26:
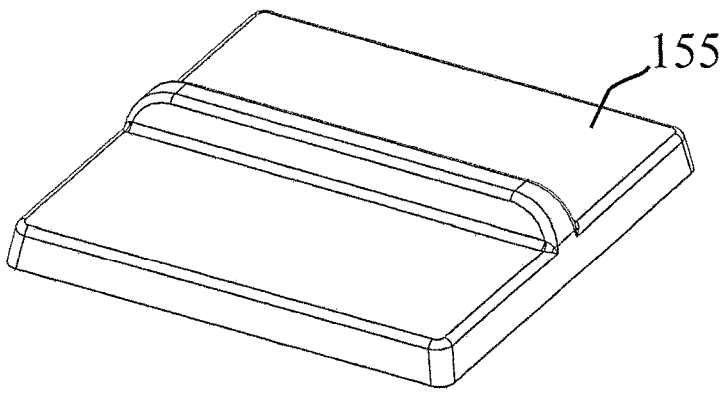
FIG. 26 shoes a support frame cover, according to one embodiment of this invention.

FIG. 26 illustrates an optional lid 155 for placement over the support frame during cooking, which can be molded from the materials discussed above. The lid 155 can include inner projections that fit into the notches in the upper end 126, an inner lip that fits within the inner perimeter of the upper end 126, or any other suitable structure to hold the lid on the upper end 126 of the support frame 120.

Figure 27:
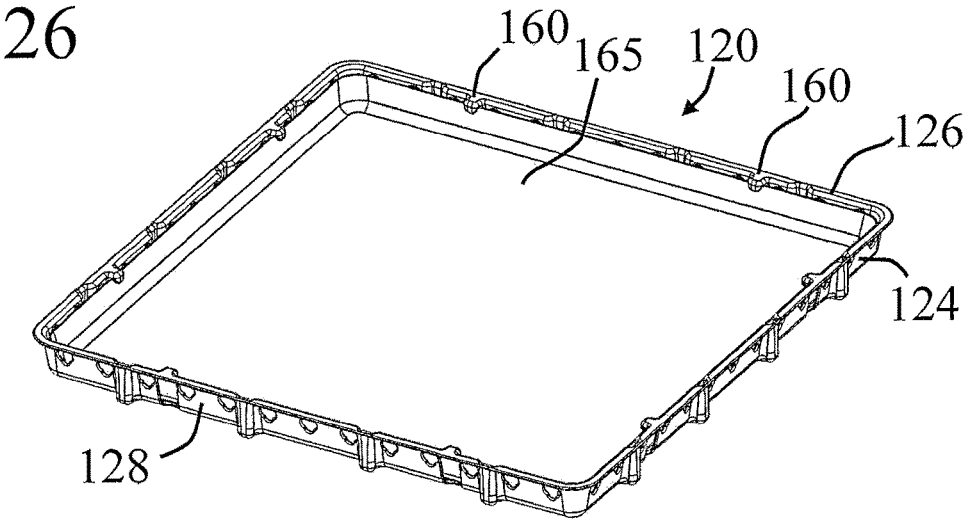
FIG. 27 shows a solid liner insert in a support frame, according to one embodiment of this invention.

As shown in FIG. 27, the support frame can receive a removable substrate 165 desirably sized and shaped to fit within and on a substrate placement area (i.e., food support surface) of the support frame 120, resting on the crossbars 130. The sheet-type substrate insert 165 of FIG. 27 is sized to cover the bottom of the substrate placement area, as shown in FIG. 27, and optionally extend up the side walls 28.

The support frame 120 of, for example, FIGS. 18, 19, and 27 can include optional securing elements or mechanisms for securing the separate substrate 165 within the support frame 120. FIG. 25 shows an embodiment without these structures. The securing elements can be or include any suitable clip, hook, slot, snap, pin, or similar element. In the embodiments illustrated, the securing element includes a plurality of hooks or clips 160 spaced apart along the upper end 126 and extending inward from the upper end 126. As shown in FIG. 27, the edges of the basket-type substrate insert 165 fit under the downward hooking securing element 160.

The support frame 120 can receive and secure a substrate insert 165 which sits on the crossbars 130 to form a food support. The substrate is semi-rigid or flexible, such as thermoformed fluoropolymer sheets or film inserts of PPS or PPS and fiberglass, and the support frame 120 provides the desired rigidity for holding food while being placed in and out of an oven. The support frame can be used to provide a more pleasing appearance, allows for easy cleaning and replacement of used substrates, as needed, and/or provides rapid heat dissipation, which can be beneficial for proper cooking and improves operator safety. Rapid heat dissipation is particularly desirable in embodiments of this invention, so as to not add to the cooking time over conventional cooking sheets or baskets.

Material blends such as PPS/PAI/PTFE, PPS/PAI/PFA/PTFE, LCP/PTFE, LCP/PTFE/PFA, or solid PTFE, PFA, FEP, PPS or LCP alone, can provide non-stick, stain resistant, and/or other easy cleaning or heat dissipative properties. The support frame and substrate are desirably both formed from a high temperature or heat resistant material that is also resistant to steam and water, thereby providing durability for multiple heating and cleaning cycles. The support frame, inserts, and substrates are desirably formed of one or more polymers having a low thermal conductivity and/or microwave transparency, thereby maximizing the cooking energy applied to the food. Additives can be included to promote desirable properties. Exemplary additives include materials that reduce the thermal mass and enable rapid cooling, such as hollow glass spheres, chopped fiberglass, mica, etc.

Figure 28:
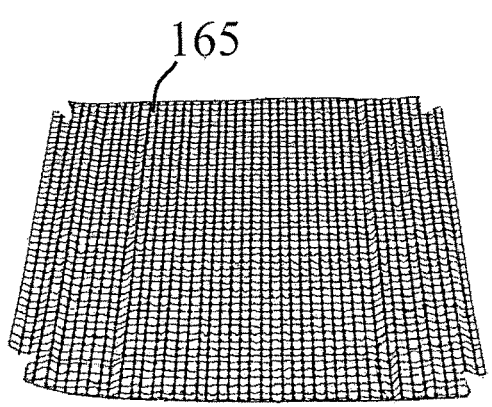
FIGS. 28 and 29 illustrate mesh inserts, according to one embodiment of this invention.
Figure 29:
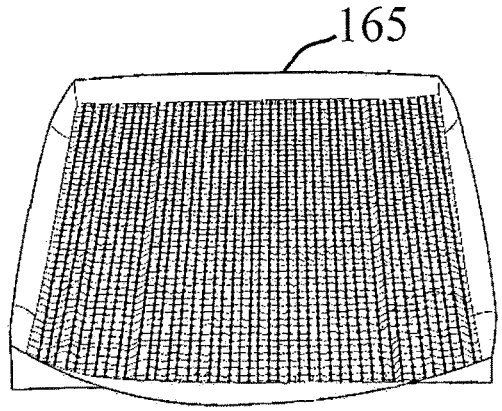

The substrate for placement within the support frame 120 can be solid as shown in FIG. 27 or open mesh, as shown in FIGS. 28 and 29. The mesh substrate of this invention can be formed, for example, from woven or otherwise interconnecting yarns, threads and/or wires, or can be an apertured film. Various materials are available for forming the mesh substrate including, without limitation, fiberglass, nylon, polyester, aramid, liquid crystal polymer (such as liquid crystal polyester), polyethylene, polyolefin, ceramic, polysulfone, polyketone, polyphenylene sulfide, polyimide, or combinations thereof. As will be appreciated by those skilled in the art following the teachings herein provided, various and alternative mesh materials are available for use in the food support of this invention. Mesh substrate insert of this invention can also be injection molded or thermoformed, for example, and then die cut or otherwise structurally separated. The coating desirably includes a heat resistant polymer, such as described above. The mesh can be slit or notched at the corners, as shown in FIG. 28, to facilitate extending the mesh over the vertical sides of the frame 120. The mesh substrate includes a coating thereon.

The mesh substrate 165 includes a plurality of openings having a length and/or width of about 0.10 inch (about 0.381 cm) to about 0.65 inch (about 1.27 cm), desirably about 0.2 inch (about 0.508 cm) to about 0.3 inch (about 0.762 cm), and more desirably about 0.22 inch (about 0.559 cm) to about 0.28 inch (about 0.711 cm). The openings have a generally square shape, although alternative shapes, such as rectangular, circular or irregular shapes, can also be used. As will be appreciated, forming the mesh of yarns or threads can result in, for example, less than perfectly square-shaped openings. Therefore, in one embodiment of this invention, the lengths and widths across the plurality of openings vary by a small margin, but at least some point include the measurements described above.

Thus, the invention provides a food support, particularly a cooking basket, tray, pan, or sheet, useful for placing and removing food items from, and holding food items while in, an oven. The food support of this invention is high temperature resistant, and can be used in ovens having retention heat temperatures as high as 600° F. (about 316° C.). The variable inserts provide the ability to cook different food items and provide desirably browning and heating characteristics. The support frame allows for use of the inserts and/or substrates in a rigid, durable, and visually pleasing manner.

Figure 30:
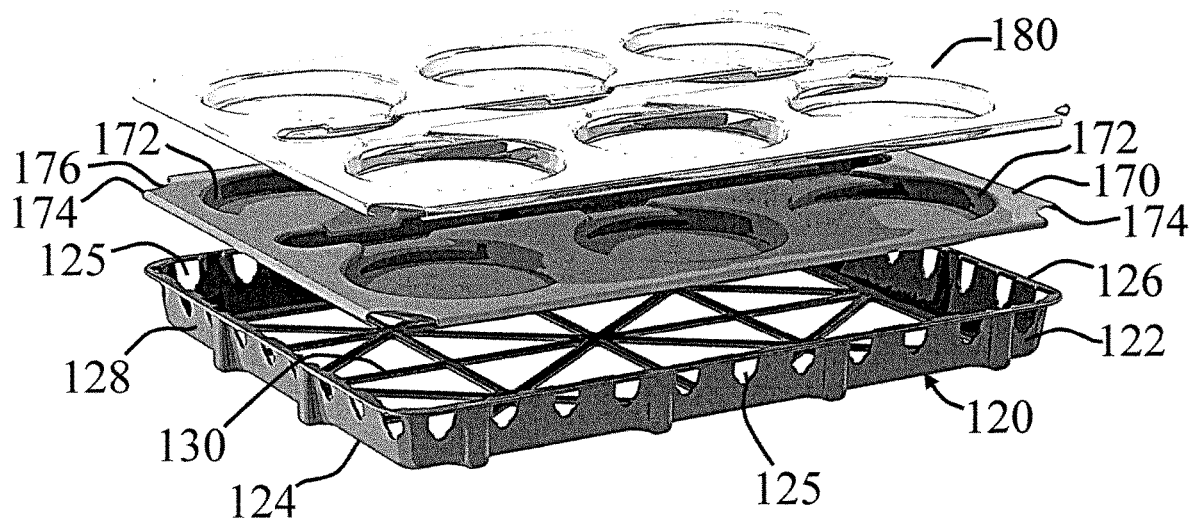
FIG. 30 shows a cooking insert in a support frame, according to one embodiment of this invention.
Figure 31:
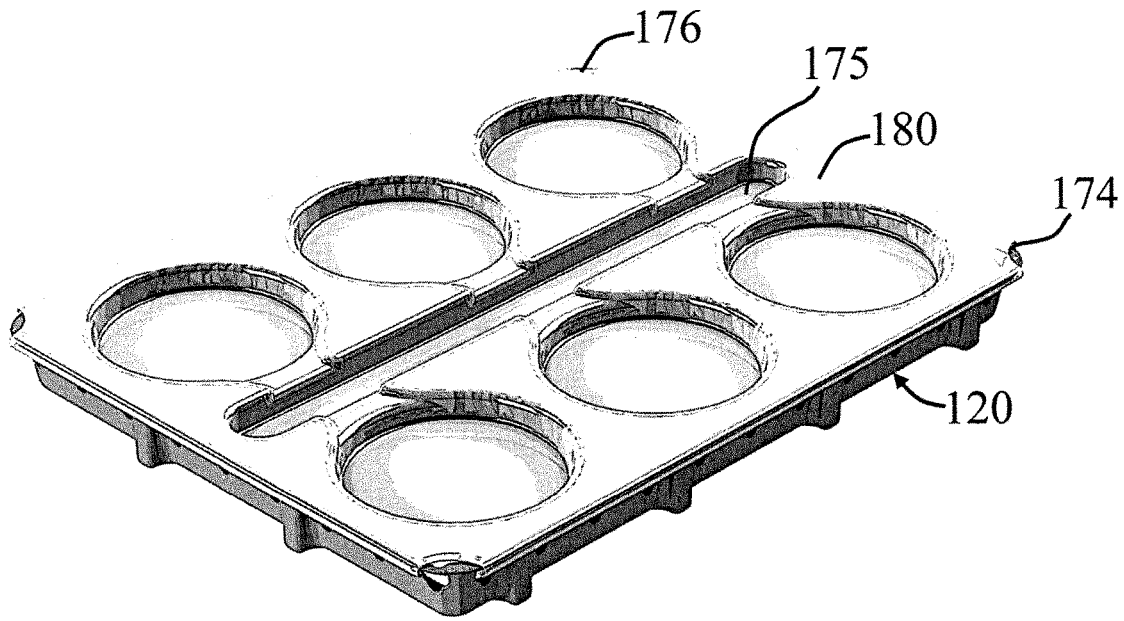
FIG. 31 is an assembled view of the cookware of FIG. 30.

FIGS. 30 and 31 illustrate a cooking support system according to one embodiment of this invention, including a support frame 120 as described above. The perimeter frame 122 has a lower edge or end 124 connected to an upper edge or end 126 by side walls 128. Crossbars 130 extend from the lower end 124 across the open interior. As previously shown in FIG. 21, this embodiment also can include insert or accommodate supports that extend in and through the correspondingly aligned pairs of the openings to support cooking inserts.

As an alternative to the cooking inserts of FIG. 21, the cooking surface insert of FIGS. 30 and 31 is designed as a snap on, or otherwise nested or press fit, tray 170. The tray 170 includes a plurality of cooking surfaces, formed as wells 172 in the tray 170. The tray 170 includes a curled edge 174 that snaps or clips over the upper edge 126. Corner cutouts 176 can make the tray 170 easier to attach. The tray 170 further includes a central overflow channel 175 connected to each well 172 to collect any fluid overflow from the wells 172.

The tray of FIGS. 30 and 31 can also be used with traditional cookware, such as metal baking sheets or pans, as a new food support surface, or be formed as a standalone sheet or pan, etc. Various and alternative sizes, shapes, materials, and configurations are available for the cooking inserts and cooking wells therein, of this invention. The illustrated cooking inserts and wells are shown as round, but any shape can be used (square, rectangular, etc.). Even non-parallel shapes (e.g., triangles) can be used. The cooking inserts can each be single or multiple pieces. Separate cooking inserts can also optionally be interlocking together, and/or clipable or otherwise semi-permanently securable to the support rods to limit movement during use. The cooking inserts can be formed of a same or different material from the frame, such as the polymers discussed above, or metal, ceramic, porcelain, the material discussed above for FIGS. 1 and 2, or combinations thereof The cooking inserts can have solid or mesh and/or flat or shaped bottoms, and can include non-stick or easy clean coatings, such as fluoropolymers (PTFE, PFA, MFA, FEP, ETFE, etc.) or silicones (silicone rubber, silicone resin, or silicone oil, etc.). The material or coatings can also include microwave subsectors to enhance cooking. Without limitation, the cooking inserts can be designed to cook food items such as eggs, omelets, pancakes, panini, pizza, bread, cookies, bacon, soup, fries, or for steaming of vegetables, eggs, rice, etc.

Figure 32:
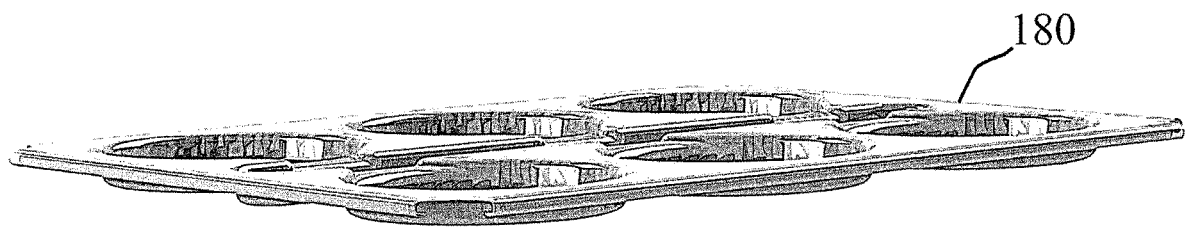
FIGS. 32 and 33 show a cooking surface insert, according to one embodiment of this invention.
Figure 33:
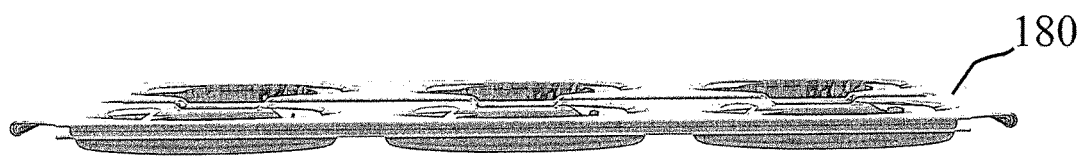

The system of FIGS. 30 and 31 further includes a cooking surface insert 180, separately shown in FIGS. 32 and 33, with a corresponding shape to snap, clip, or press over and around the cooking insert 170. The surface insert 180, such as described above for FIG. 1, can impart a nonstick surface, one that is removable and desirably recyclable. The surface insert 180 is preferably a thin material, such as a more expensive and/or recyclable non-stick material, which is rigid enough to snap over the cooking insert, but generally supported by the cooking insert, which is supported by the frame for ease of adding/removing from an oven.

The support frame and cooking/surface inserts are all desirably formed from a high temperature or heat resistant material that is also resistant to steam and water, thereby providing durability for multiple heating and cleaning cycles. The support frame and inserts are desirably formed of one or more polymers having a low theiinal conductivity and/or microwave transparency, thereby maximizing the cooking energy applied to the food. Material blends such as PEEK/PTFE (or other fluoropolymers/blends), PAEK/PTFE, PPS/PAI/PTFE, PPS/PAI/PFA/PTFE, LCP/PTFE, LCP/PTFE/PFA, or solid PTFE, PFA, FEP, PPS or LCP alone, can provide non-stick, stain resistant, and/or other easy cleaning or heat dissipative properties. In preferred embodiments, the surface inserts is formed of pure melt-processible fluoropolymers, such as discussed above. Additives can be included to promote desirable properties. Exemplary additives include materials that reduce the thermal mass and enable rapid cooling, such as hollow glass spheres, chopped fiberglass, mica, etc.

Figure 34:
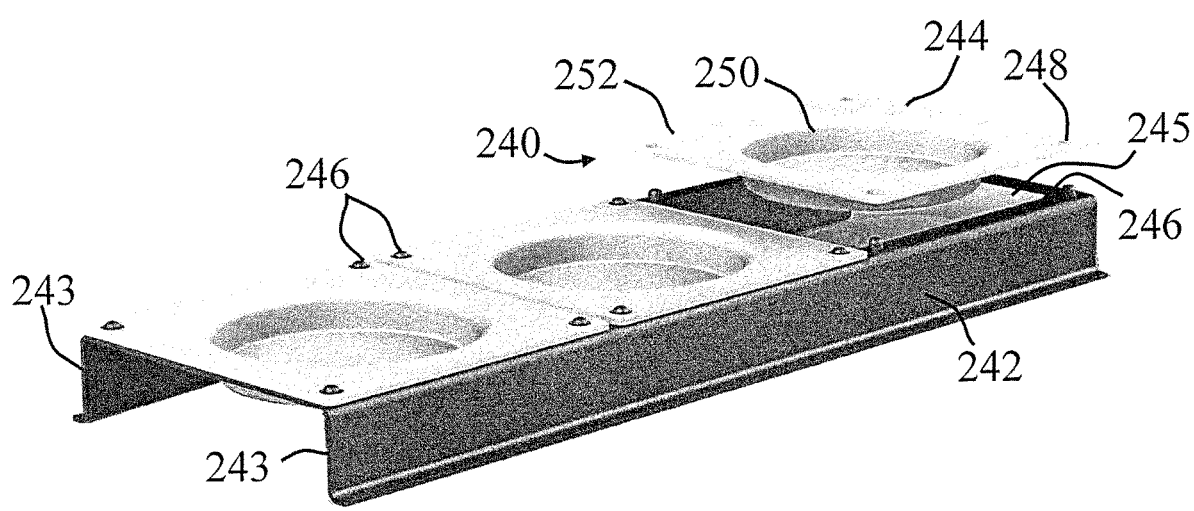
FIG. 34 shows a cookware apparatus, according to one embodiment of this invention.

FIG. 34 illustrates a cookware apparatus 240 according to another embodiment of this invention, and desirably fully formed heat resistant polymers or composites discussed above to impart high heat resistance. FIG. 34 shows a non-metallic support frame 242, raised on two parallel side walls 243, for securing at least one, and desirably a plurality of, food cooking inserts 244, such as a tray, basket, pan, cup, etc. The food cooking inserts 244, are secured to a top surface of the frame 242 by any suitable securing mechanism, such as the post 246 and hole 248 structures shown in FIG. 34. The cooking inserts 244 include a food basin, reservoir, or bowl 250 for receiving and holding the food item to be cooked. The food basin 250 is surrounded by an edge 252 that sits on the top of the frame 242, with the food basin 250 extending through an opening 245 in the frame 242. The food basins 250 are shown in FIG. 34 as round, such as for cooking pancakes or eggs, but can be any suitable shape. Various and alternative sizes, shapes and configuration are available for the frame, cooking inserts, and securing mechanism of FIG. 34, depending on need. For example, inserts can include snap on, clipable, or otherwise press fit edges similar to those discussed above, or the support frame can include one or more openings or slots along the top surface to receive posts, extensions, or otherwise downwardly curved clip-like edges of the inserts.

Figure 35:
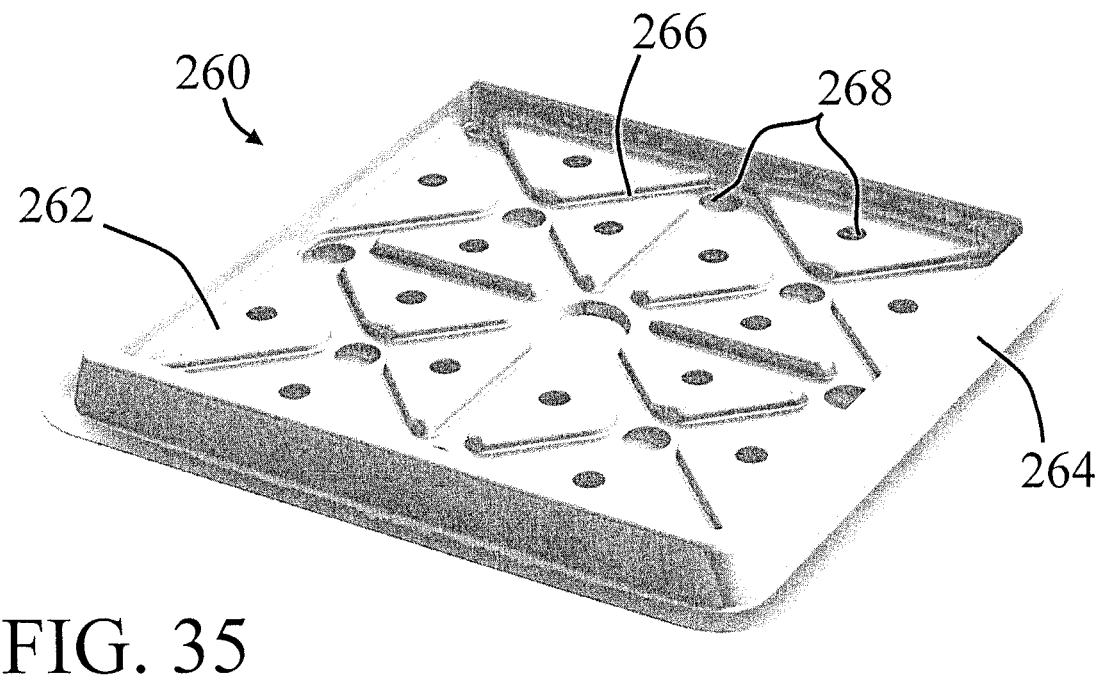
FIGS. 35 and 36 shows a cookware apparatus, according to one embodiment of this invention.
Figure 36:
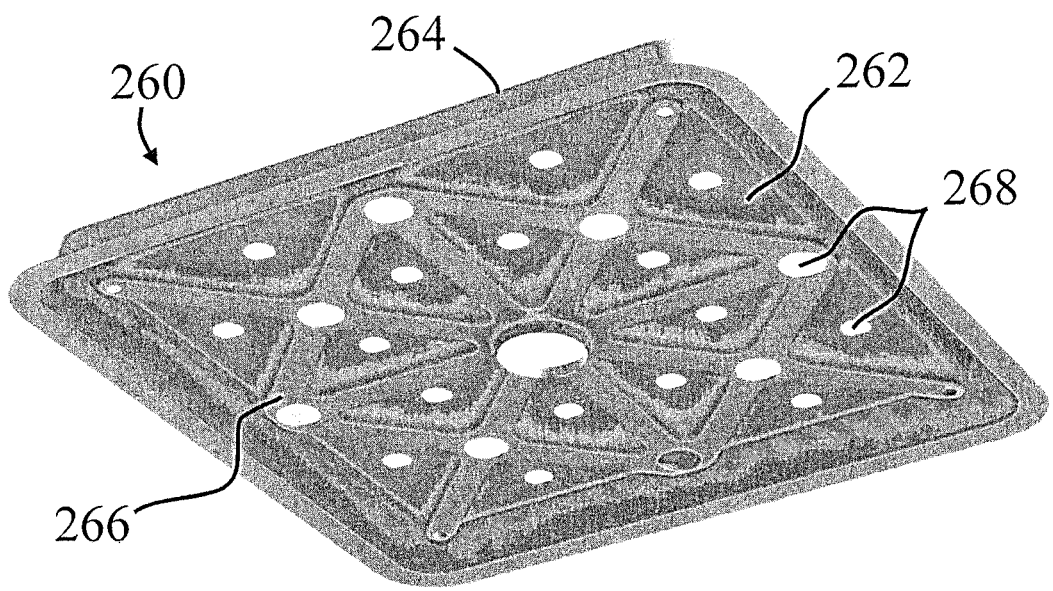

FIGS. 35 and 36 illustrate a cookware apparatus 260 according to another embodiment of this invention and desirably formed from the heat resistant polymers or composites discussed above to impart high heat resistance. The apparatus 260 includes a food support surface thermoformed from a plastic sheet or composite/laminate and embodied as a cooking tray 262. The cooking tray extends between upper edges of perimeter side walls 264 that hold the tray 262 above and off a cooking surface. The tray 262 includes a pattern of crossing rib channels 266 that provide rigidity and facilitate heated air flow about the food. The tray 262 includes a plurality of openings 268 to allow heated air through the tray 262. Various and alternative configurations are available for the support area, side walls, rib channels, and openings. As shown in FIGS. 35 and 36 there is a center opening, at least one opening at some or each rib channel intersection, and at least one opening in some or each support surface section formed between corresponding rib cannels. Channel and/or hole size, shape, and placement can vary depending on need, and mesh substrates as discussed above can be used on the tray to limit falling crumbs.

Figure 37:
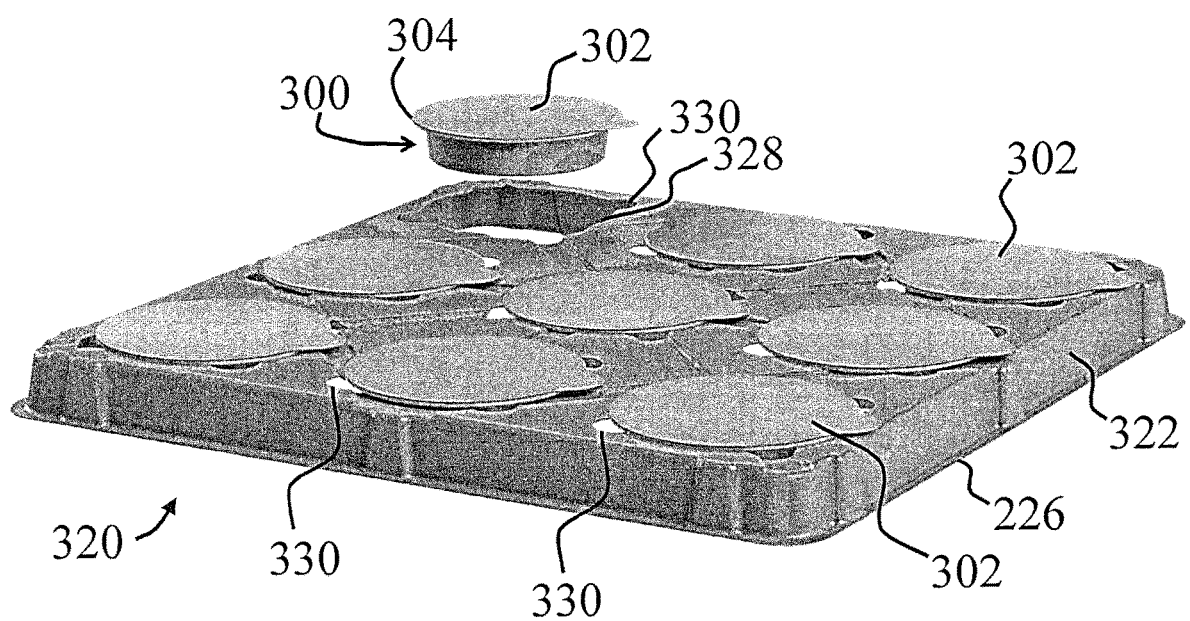
FIG. 37 shows a cookware apparatus, according to one embodiment of this invention.

FIG. 37 shows an alternative cooking support embodiment for receiving and cooking inserts 300. The cooking support includes a support frame 320 is desirably made from any one or more polymers discussed herein. The support frame 320 includes side walls 322, a top tray surface 324, and an open bottom within bottom peripheral edge 326 and between the side walls 322. The tray 324 includes openings 328, each for receiving one of the inserts 300. Each opening 328 has a diameter sized smaller than an upper lip 304 of the insert 300 to allow the insert 300 to sit thereon. The openings 328 further include opposing and/or peripheral opening extensions 330 to allow finger or tool access for removing each of the inserts 300 after cooking. As will again be appreciated, various sizes, shapes, and configurations are available for the inserts, tray, and openings of this invention, depending on need and the items to be cooked/baked. For example, the bottom and opening pattern can also be used with the side walls and inserts of FIG. 18, to provide a multi-use cookware device.

In embodiments of this invention, the cooking inserts 300 are formed, at least in part, of a disposable or single use material made from natural or pulp materials, such as bagasse, wheat straw, paper, wood, hemp, bamboo, etc. These inserts are capable of withstanding single cook cycles and thus are considered highly relevant for certain uses. For example, the cooking inserts 150 of FIG. 21 could be formed of such pulp materials, and supported on corresponding multi-use platforms or ring-shaped holders extending between the bars 140.

In some embodiments of this invention, the single-use pulp cooking inserts are pre-packaged and sealed prior to cooking, typically at a remote location and shipped to the restaurant for cooking. FIG. 37 illustrates an exemplary cooking insert 300 formed of natural pulp materials. The insert 300 contains a food product for cooking, such as, without limitation, eggs or dough batter (e.g., batter for soufflé, pancake, cupcake, muffins, doughnuts, etc.). The insert is sealed with lid 302, also desirably paper, for storage and/or shipment. Alternatively, an empty insert cup 200 could be filled by the user at the cooking location. Exemplary inserts and/or materials therefor include Rigid Containers, available from Chef Pack, and/or can be made according to U.S. 2018/0346228, herein incorporated by reference.

Thus, the invention provides cooking devices or components, such as a cooking basket, tray, or sheet, useful for placing and removing food items from, and holding food items while in, an oven, and materials therefor. The cookware and materials of this invention are nonstick and high temperature resistant, and can be used in ovens having retention heat temperatures as high as 600° F. (about 316° C.). The variable cooking inserts provide the ability to cook different food items and provide desirably browning and heating characteristics. The support frame allows for use of the inserts and/or substrates in a rigid, durable, and visually pleasing manner. The surface inserts allow for improved and replaceable/recyclable nonstick surfaces.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. Cookware for holding food items during cooking, comprising:
    a laminate material adapted to impart structural rigidity, the laminate material including at least three layers, each layer including a flexible substrate saturation coated with a heat resistant engineered thermoplastic material, and laminated to at least one other of the at least three layers; and
    a heat resistant nonstick coating applied to at least one side of the laminate material to form a coated laminate, wherein the cookware is formed of the coated laminate pressed or molded into a predetermined shaped cookware, and the cookware is fully free of metal.

2. The cookware according to claim 1, wherein the heat resistant nonstick coating comprises a melt-processible fluoropolymer, selected from a perfluoroalkoxy alkane (PFA), TFE/perfluoromethylvinylether copolymer (MFA), fluorinated ethylene propylene (FEP), homopolymer or copolymers of PTFE, or combinations of such fluoropolymers.

3. The cookware according to claim 1, wherein a saturation coating for the each layer comprises a spray or dip engineered thermoplastic material coating, wherein an outermost surface of exposed engineered thermoplastic material coating is covered and/or laminated with a casted or laminate film of the heat resistant nonstock coating, wherein the outermost surface of exposed engineered thermoplastic material and the film are cured and interlocked together.

4. The cookware according to claim 1, wherein the cookware is pressed or molded in the form of a basket, tray, sheet, pan, bowl or cup, plate, cover, or other cookware accessory.

5. The cookware according to claim 4, wherein the cookware can withstand temperatures over 500° F. (260° C.) for an indefinite period of time.

6. The cookware according to claim 1, wherein the cookware comprises a cooking surface that is clipped, snapped, or press-fit to a second cookware around an upper edge of the second cookware and extends over a food support surface of the second cookware.

7. The cookware according to claim 1, wherein the cookware comprises a separately formed cooking surface insert applied as or over a food support surface of a second cookware, wherein the surface insert is replaceable and/or recyclable.

8. The cookware according to claim 7, wherein the cooking surface insert comprises a snap on nonstick cover, wherein an edge of the nonstick cover is configured to snap around an edge of the cookware that is disposed about the food support surface.

9. A replaceable cooking surface or insert for a food support surface according to claim 1.

10. A use of the replaceable cooking surface of claim 9, comprising removing and replacing the cooking surface or insert.

11. A method comprising providing a removable and replaceable cooking surface or insert as the cookware according to claim 1, which is separate from and adapted to be removably secured within a second cookware for holding food items during cooking in an oven.

12. The method of claim 11 further comprising a subscription service for regular replacement and recycling of the cooking surface or insert.

13. The cookware according to claim 1, wherein the heat resistant engineered thermoplastic material comprises a polyimide, a polyamide-imide, a polyphenylene sulfide, a polyketone, a polyether ether ketone, a polyphenylsulfone, a polysulfone, a polyether sulfone, a liquid crystal polymer or combinations thereof.

14. The cookware according to claim 1, wherein the heat resistant engineered thermoplastic material comprises a material blend of a polyamide-imide and a polymer selected from a polyphenylene sulfide, a polyether sulfone, or a polyphenylsulfone.

15. Cookware for holding food items during cooking, including a food support surface comprising a cooking surface formed of a heat resistant polymer material, and further comprising:
   a cooking support including a support frame having side walls defining a cooking area, and an inner support structure; and
   a removable and replaceable cooking insert adapted to be inserted into the cooking support and on the inner support structure, wherein the cooking insert includes the cooking surface and receives the food items during cooking;
   wherein the cooking insert comprises a tray and/or a cup extending between upper edges of the side walls, and the tray and/or the cup includes a hole that fits over a post on an upper perimeter edge of the side walls.

16. The cookware according to claim 15, wherein the heat resistant polymer material comprises a melt-processible fluoropolymer.

17. The cookware according to claim 16, wherein the melt-processible fluoropolymer is a perfluoroalkoxy alkane (PFA), TFE/perfluoromethylvinylether copolymer (MFA), fluorinated ethylene propylene (FEP), homopolymer or copolymers of polytetrafluoroethylene (PTFE), or combinations of such fluoropolymers.

18. The cookware according to claim 15, further comprising a second removable and replaceable cooking insert adapted to be inserted into the cooling support.

19. The cookware according to claim 18, wherein each of the plurality of inserts comprises a food basin surrounded by an edge, the edge including the hole.

20. Cookware for holding food items during cooking, comprising:
   a laminate material adapted to impart structure rigidity, the laminate material including at least three layers, each layer including a flexible substrate saturation coated with a heat resistant engineered thermoplastic material, and laminated to at least one other of the at least three layers, wherein the heat resistant engineered thermoplastic material comprises a polyimide, a polyamide-imide, a polyphenylene sulfide, a polyketone, a polyether ether ketone, a polyphenylsulfone, a polysulfone, a polyether sulfone, a liquid crystal polymer or combinations thereof; and
   a heat resistant nonstick coating applied to at least one side of the laminate material to form a coated laminate, wherein the cookware is formed of the coated laminate pressed or molded into a predetermined shaped cookware.

21. The cookware according to claim 20, wherein the heat resistant engineered thermoplastic material comprises a material blend of a polyamide-imide and a polymer selected from a polyphenylene sulfide, a polyether sulfone, or a polyphenylsulfone.

22. A replaceable cooking surface or insert for a food support surface for holding food items during cooking, comprising:
   a laminate material adapted to impart structural rigidity, the laminate material including at least three layers, each layer including a flexible substrate saturation coated with a heat resistant engineered thermoplastic material, and laminated to at least one other of the at least three layers, and
   a heat resistant nonstick coating applied to at least one side of the laminate material to form a coated laminate, wherein the cookware is formed of the coated laminate pressed or molded into a predetermined shaped cookware.

23. the cookware according to claim 22, wherein the heat resistant engineered thermoplastic material comprises a polyimide, a polyamide-imide, a polyphenlylene sulfide, a polyketone, a polyether ether ketone, a polyphenylsulfone, a polysulfone, a polyether sulfone, a liquid crystal polymer or combinations thereof.

24. The cookware according to claim 22, wherein the heat resistant engineered thermoplastic material comprises a material blend of a polyamide-imide and a polymer selected from a polyphenylene sulfide, a polyether sulfone, or a polyphenylsulfone.

25. A use of the replaceable cooking surface of claim 22, comprising removing and replacing the cooking surface or insert.

* * * * *